(12) United States Patent
Kingetsu et al.

(10) Patent No.: US 7,239,342 B2
(45) Date of Patent: Jul. 3, 2007

(54) IMAGE PROCESSING APPARATUS AND METHOD

(75) Inventors: Yasuhiro Kingetsu, Sakai (JP); Kenji Nakamura, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 853 days.

(21) Appl. No.: 10/446,195

(22) Filed: May 28, 2003

(65) Prior Publication Data
US 2004/0160525 A1  Aug. 19, 2004

(30) Foreign Application Priority Data
Feb. 14, 2003  (JP) .............................. 2003-036548

(51) Int. Cl.
*H04N 5/232* (2006.01)
*H04N 5/235* (2006.01)
*G03B 5/00* (2006.01)

(52) U.S. Cl. .............................. 348/208.4; 348/208.12; 348/208.16; 396/52; 396/53; 396/54; 396/55; 382/255; 382/266; 382/270

(58) Field of Classification Search ............. 348/208.2, 348/208.4, 208.5, 208.6, 208.12, 208.16; 396/52, 53, 54, 55; 382/255, 266, 270
See application file for complete search history.

(56) References Cited

U.S. PATENT DOCUMENTS

| | | | |
|---|---|---|---|
| 4,879,600 A | | 11/1989 | Ise et al. |
| 5,379,063 A | * | 1/1995 | Kishi et al. ............. 348/208.6 |
| 5,502,484 A | * | 3/1996 | Okada .................... 348/208.6 |
| 6,639,626 B1 | | 10/2003 | Kubo et al. |

FOREIGN PATENT DOCUMENTS

| | | | |
|---|---|---|---|
| JP | 06-284328 | * | 10/1994 |
| JP | 2000-23016 A | | 1/2000 |
| JP | 2001-045361 | * | 2/2001 |
| JP | P2001-45361 A | | 2/2001 |
| JP | 2001-177760 | * | 6/2001 |
| JP | P2001-177760 A | | 6/2001 |

OTHER PUBLICATIONS

Chan et al., "Video CCD Based Portable Digital Still Camera", IEEE Transactions on Consumer Electronics, vol. 41, No. 3, Aug. 1995, pp. 455-459.*

* cited by examiner

*Primary Examiner*—David Ometz
*Assistant Examiner*—Wanda Negrón
(74) *Attorney, Agent, or Firm*—McDermott Will & Emery LLP

(57) ABSTRACT

An object of the present invention is to generate an image which is prevented from being influenced by a movement while suppressing increase in noise components. When a movement is detected during exposure of an image capturing device to light, an image capturing apparatus stops the exposure of the image capturing device and amplifies an image signal obtained with the exposure, thereby compensating exposure shortage. Luminance information is extracted from a captured image, and color information is extracted from a live view image obtained at a timing different from a timing at which the captured image is obtained. By synthesizing the luminance information of the captured image and the color information of the live view image, noise components included in color information are reduced.

9 Claims, 19 Drawing Sheets

F I G. 1 3
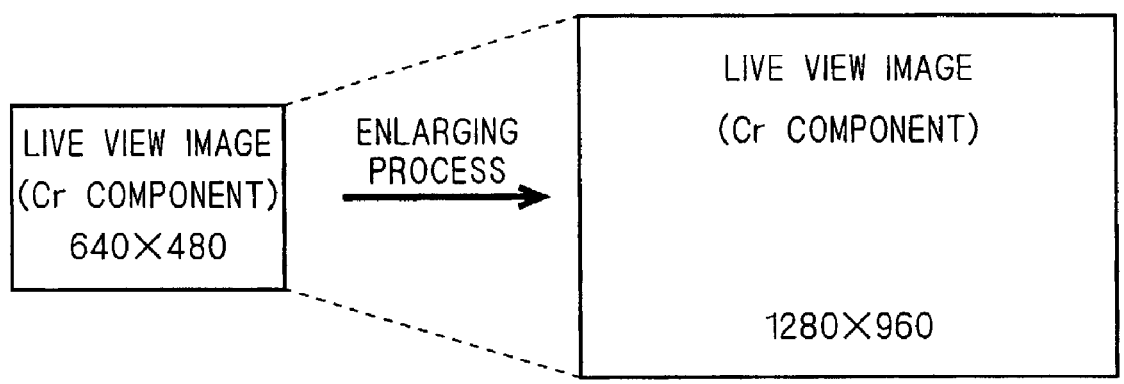
F I G. 1 4
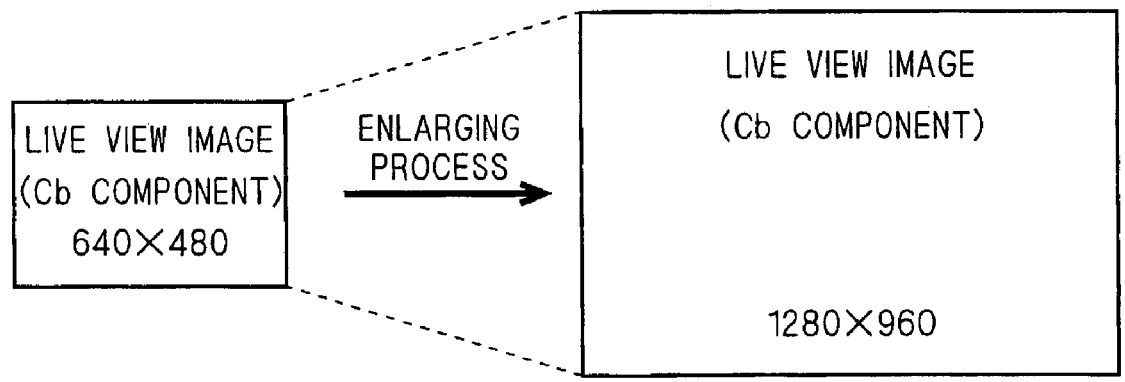

FIG. 15
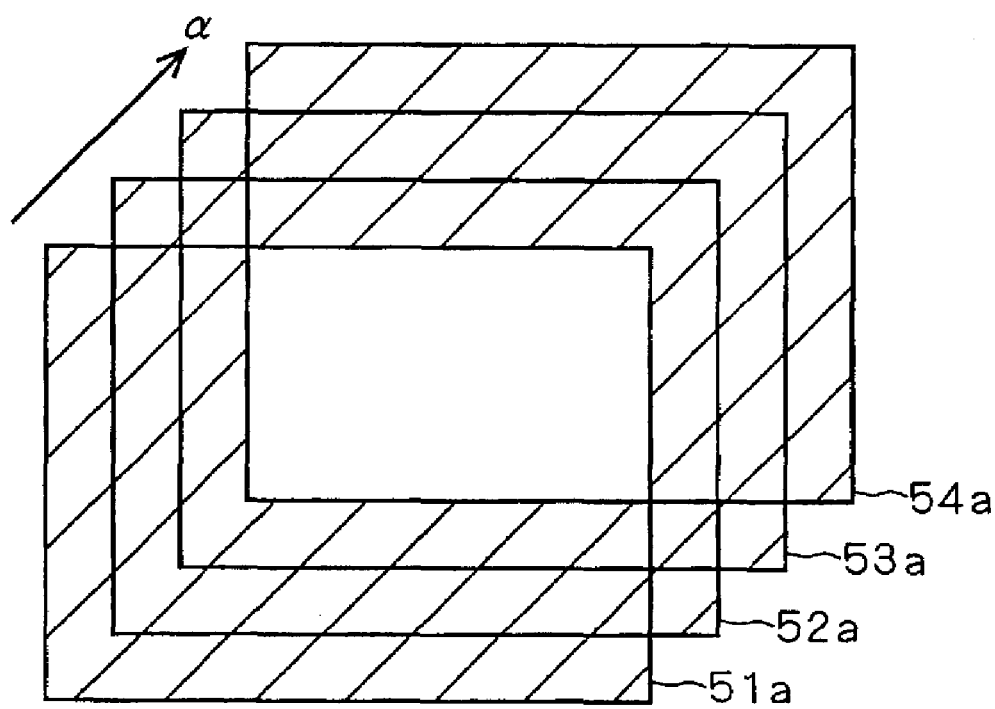
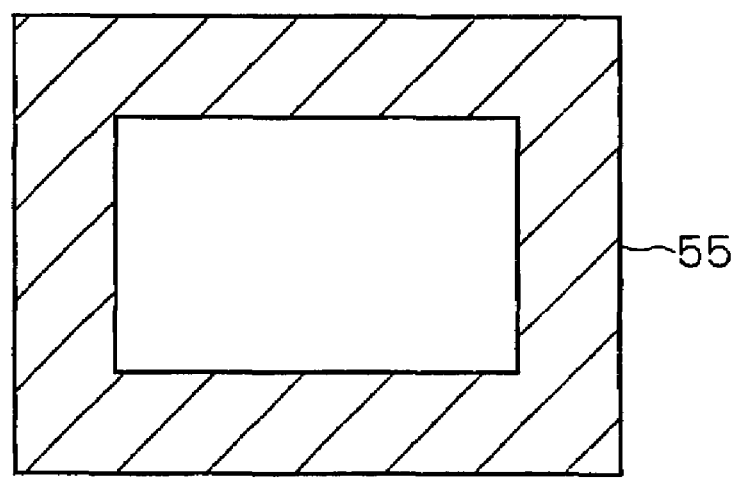

```
MOVEMENT CORRECTING PROCESS
SELECTION MENU
▷ ONLY STOP EXPOSURE
▷ STOP EXPOSURE AND AUTOMATIC INCREASE GAIN
▶ STOP EXPOSURE AND AUTOMATICALLY
   INCREASE GAIN + COLOR CORRECTION
▷ NO MOVEMENT CORRECTING PROCESS
```

```
ISO SENSITIVITY (GAIN) SELECTION MENU
▶ ISO100
▷ ISO200
▷ ISO400
▷ ISO800
```

FIG. 22

```
<WARNING>
  ISO SENSITIVITY WILL BE
  AUTOMATICALLY CHANGED

▷ OK
▷ CANCEL
```

FIG. 23

```
<WARNING>
SETTING WILL BE AUTOMATICALLY
CHANGED TO "NO MOVEMENT CORRECTION"

▷ OK
▷ CANCEL
```

FIG. 24

```
MOVEMENT CORRECTING PROCESS SELECTING MENU

▶ ONLY STOP EXPOSURE

▷ STOP EXPOSURE AND AUTOMATICALLY
  INCREASE GAIN

▷ STOP EXPOSURE AND AUTOMATICALLY
  INCREASE GAIN + COLOR CORRECTION

▷ NO MOVEMENT CORRECTING PROCESS
```

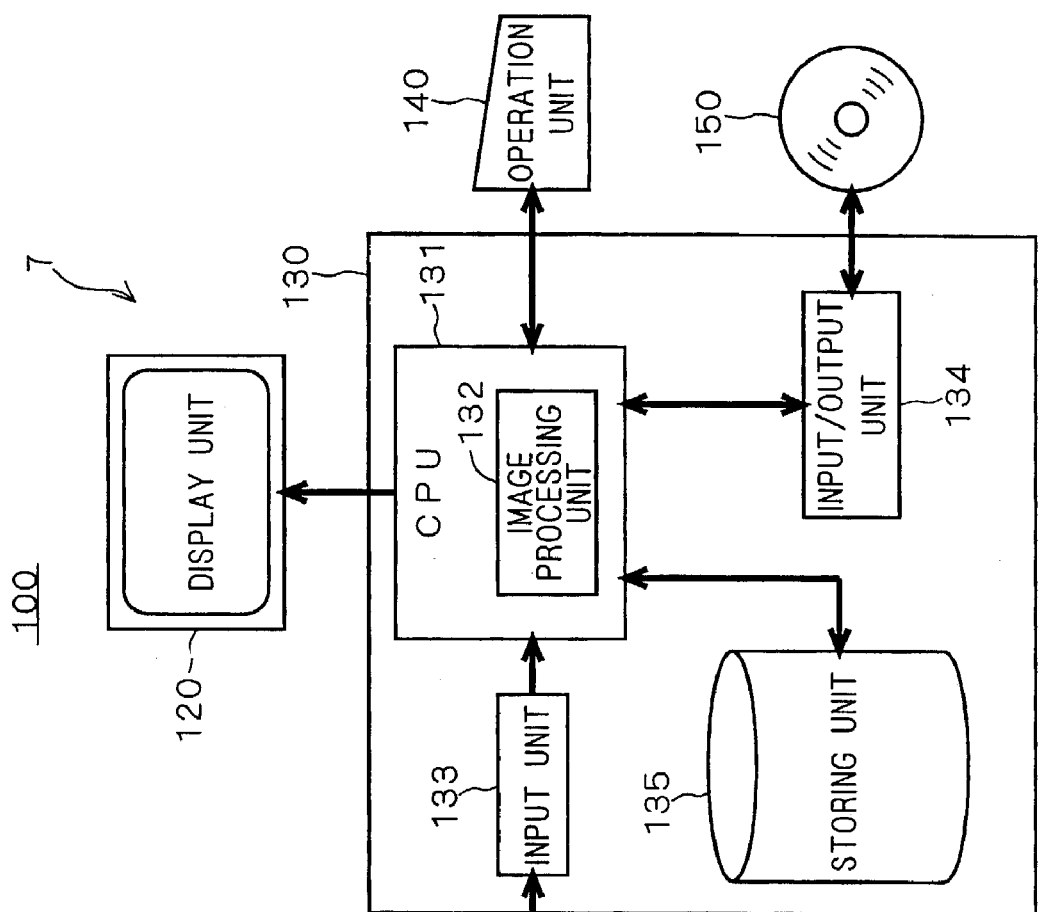
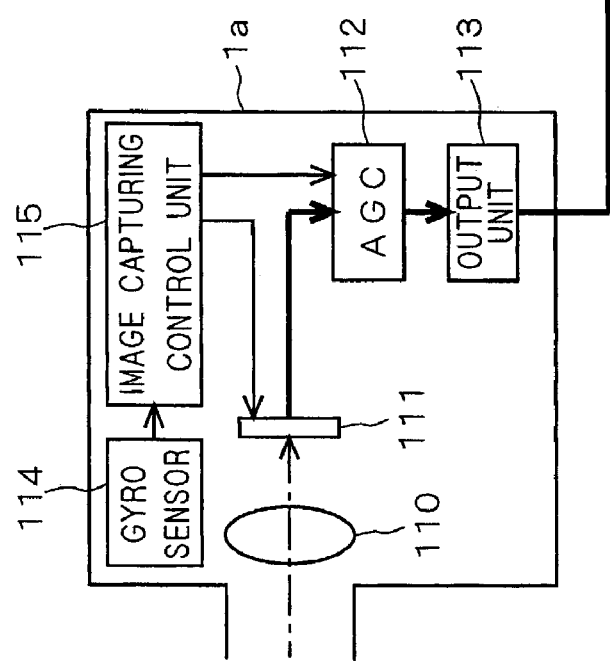
FIG. 26

IMAGE PROCESSING APPARATUS AND METHOD

This application is based on application No. 2003-036548 filed in Japan, the contents of which are hereby incorporated by reference.

BACKGROUND OF THE INVENTION

1. Field of the Invention

The present invention relates to an image capturing apparatus such as a digital camera, an image processing apparatus, and an image processing method and, more particularly, to an image processing technique of processing an image obtained by photographing when a movement occurs at the time of the photographing.

2. Description of the Background Art

An image capturing apparatus such as a digital camera having a movement correcting mechanism (auto stabilization mechanism) for mechanically correcting a movement (for example, blur) of the image capturing apparatus relative to the subject, which occurs during photographing is known. The movement correction of this kind is realized by detecting a movement amount by using an acceleration sensor or the like and, for example, by displacing an optical system or an image capturing device such as a CCD image sensor to correct a relative displacement between the image capturing apparatus and the subject in accordance with the movement amount.

However, the configuration and control of such a mechanical movement correcting mechanism are complicated. Moreover, since response speed to a movement is limited, when a relative displacement between the image capturing device and the subject due to a movement occurs at a speed higher than the response speed, a situation such that a movement cannot be corrected by the mechanical movement correcting mechanism occurs. Therefore, attempts are being made to correct a movement without providing the mechanical movement correcting mechanism.

As a technique for correcting a movement without providing a movement correcting mechanism, for example, an image capturing apparatus for detecting a movement amount during exposure of an image capturing device, if the movement amount exceeds a predetermined value during the exposure, interrupting the exposure and compensating deterioration in picture quality due to insufficient exposure by increasing the gain of an amplifier provided at the post stage of the image capturing device is known (for example, Japanese Patent Application Laid-Open No. 2001-45361).

In the conventional technique, however, when the exposure amount is insufficient, the gain is increased uniformly for a whole image, so that a noise component is also amplified. It causes a problem such that an image of low picture quality with conspicuous noise is resulted.

SUMMARY OF THE INVENTION

The present invention is directed to an image capturing apparatus.

According to the present invention, an image capturing apparatus includes: an image sensor for converting a subject image into an image signal; a movement detector for detecting a movement of the image capturing apparatus relative to the subject; an exposure controller for interrupting exposure of the image sensor when a movement is detected by the movement detector during exposure of the image sensor to light; a first image generator for generating first image data by amplifying an image signal read out from the image sensor of which exposure is interrupted by the exposure controller; and a second image generator for extracting luminance information from the first image data, extracting color information from second image data obtained from the image sensor at a timing different from the timing at which the first image is obtained, and generating image data obtained by synthesizing the luminance information and the color information.

With such a configuration, the image capturing apparatus can obtain an image which is not influenced by a movement. Noise components amplified by signal amplification can be made inconspicuous.

According to an aspect of the present invention, the image capturing apparatus further includes: an instructing member for instructing start of exposure by the image sensor; and a memory for storing the second image data before an instruction from the instructing member. The second image generator extracts the color information from the second image data stored in the memory.

According to another aspect of the present invention, in the image capturing apparatus, the second image data obtained from the image sensor just before the instruction from the instructing member is stored in the memory.

By the operation, the time difference between the first image data and the second image data to be synthesized can be shortened, so that a synthesizing process of a high degree of matching can be performed.

According to still another aspect of the present invention, in the image capturing apparatus, the movement detector detects an amount of the movement of the image capturing apparatus relative to the subject, and the second image data is deleted from the memory when the amount of the movement detected by the movement detector becomes equal to or larger than a predetermined amount.

With the configuration, the second image data of a low degree of matching with the first image data can be prevented from being used for the synthesizing process.

According to yet another aspect of the present invention, in the image capturing apparatus, the second image data of a plurality of frames is stored in the memory, and the second image generator extracts the color information on the basis of the second image data of the plurality of frames stored in the memory.

With the configuration, noise component included in the second image data can be suppressed.

According to yet another aspect of the present invention, in the image capturing apparatus, the movement detector detects an amount of the movement of the image capturing apparatus relative to the subject, and the exposure controller starts exposing the image sensor to light after an instruction of starting exposure by the instructing member is given and the amount of the movement detected by the movement detector becomes equal to or smaller than a predetermined amount.

With the configuration, an image which is not moved so much can be obtained.

According to yet another aspect of the present invention, in the image capturing apparatus, the movement detector detects an amount of the movement of the image capturing apparatus relative to the subject, and when the amount of the movement detected by the movement detector becomes equal to or larger than a predetermined amount, the exposure controller interrupts the exposure of the image sensor to light.

With the configuration as well, an image which is not moved so much can be obtained.

According to yet another aspect of the present invention, in the image capturing apparatus, the second image generator adjusts a synthesis position where the luminance information and the color information is synthesized on the basis of an output of the movement detector.

With the configuration, the degree of matching at the time of synthesis becomes high and a high-quality synthetic image can be obtained.

According to the present invention, an image capturing apparatus includes: an image sensor for converting a subject image to an image signal; a movement detector for detecting a movement of the image capturing apparatus relative to the subject; a corrector for correcting the movement on the basis of an output of the movement detector; a first selector for selecting whether a blur correction by the corrector is performed or not; a second selector for selecting gain of the image signal; and a controller for controlling another selection on the basis of one of the selections of the first and second selectors.

With the configuration, a process which cannot be performed by the image capturing apparatus can be prevented from being selected.

The present invention is also directed to an image processing apparatus.

According to the present invention, an image processing apparatus includes: an input part for receiving first image data obtained in exposure time shorter than a proper value and second image data obtained at a timing different from a timing at which the first image data is obtained; an extractor for extracting luminance information and color information from the first image data and extracting color information from the second image data; and an image generator for generating a synthetic image obtained by synthesizing the luminance information and color information from the first image data and the color information of the second image data.

With the configuration, noise components included in color information can be reduced.

According to an aspect of the present invention, in the image processing apparatus, the image generator further divides each of the first and second image data into a plurality of areas and performs a synthesizing process on each of the divided areas.

With the configuration, the synthesizing process of a high degree of matching can be performed on each area, so that a high-quality synthetic image can be obtained.

According to another aspect of the present invention, the image processing apparatus further includes a detector for detecting the degree of correlation between the first and second image data, and the image generator generates the synthetic image on the basis of the degree of correlation detected by the detector.

With the configuration, a process in which the degree of matching in the synthesizing process and the picture quality are considered is realized, and an excellent synthetic image can be obtained.

The present invention is also directed to an image processing method.

According to the present invention, an image processing method includes the steps of: receiving first image data obtained in exposure time shorter than a proper value and second image data obtained at a timing different from a timing at which the first image data is obtained; extracting luminance information and color information from the first image data and extracting color information from the second image data; and generating a synthetic image by synthesizing the luminance information and color information of the first image data and the color information of the second image data.

Therefore, in the present invention as well, noise components included in color information can be reduced.

As described above, the present invention has been achieved to solve the problems of the background art, and an object thereof is to provide an image processing technique capable of generating an image which is not influenced by a movement while suppressing increase in noise components.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a diagram showing a process of enlarging a live view image (Cr component image);

FIG. 14 is a diagram showing a process of enlarging a live view image (Cb component image);

FIG. 15 is a diagram showing the concept of process of generating an image ratio correction from a plurality of live view images;

FIG. 22 is a diagram showing an example of warning indication;

FIG. 23 is a diagram showing an example of warning indication;

FIG. 24 is a diagram showing an example of the movement correcting process selecting menu screen;

FIG. 26 is a diagram showing the configuration of an image processing system including an image processing apparatus.

DESCRIPTION OF THE PREFERRED EMBODIMENTS

Hereinafter, preferred embodiments of the present invention will be described in detail with reference to the drawings.

1. First Preferred Embodiment

Figure 1:
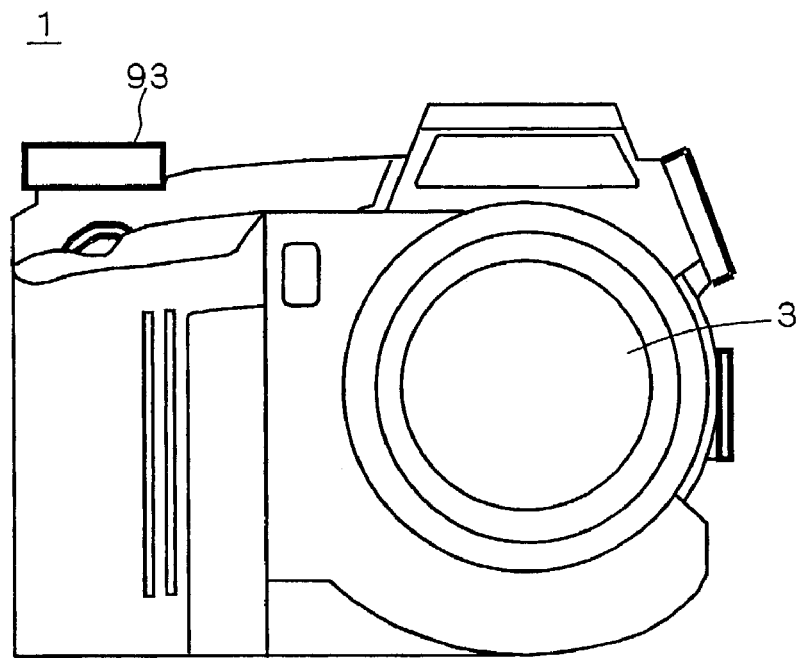
FIG. 1 is a front view showing the appearance of an image capturing apparatus.
Figure 2:
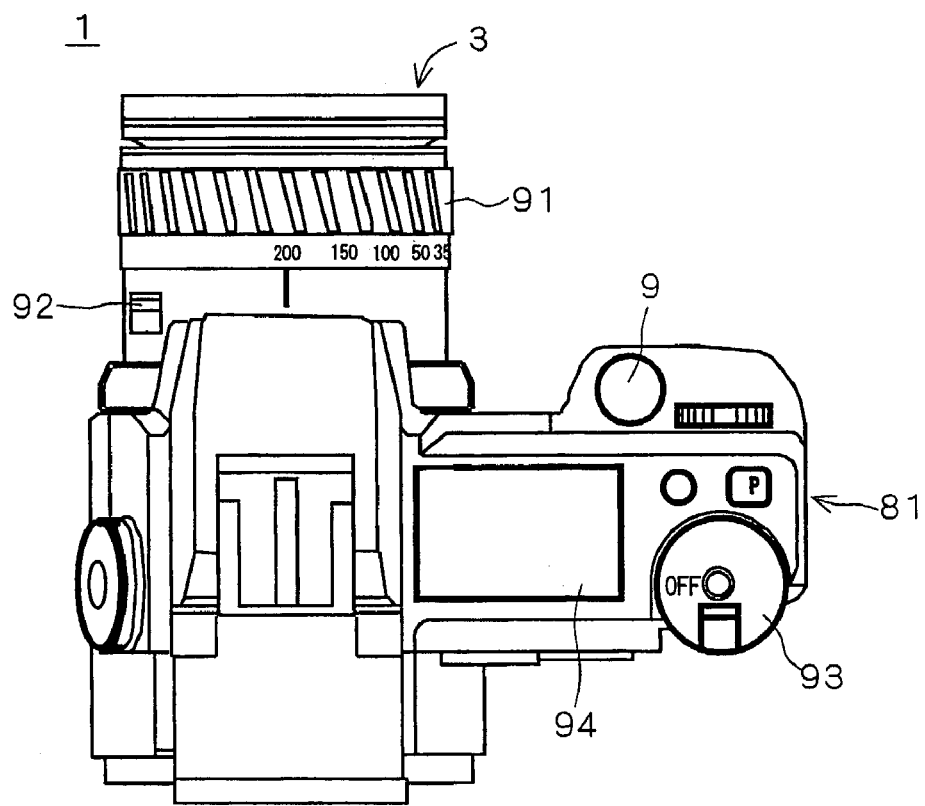
FIG. 2 is a top view showing the appearance of the image capturing apparatus.
Figure 3:
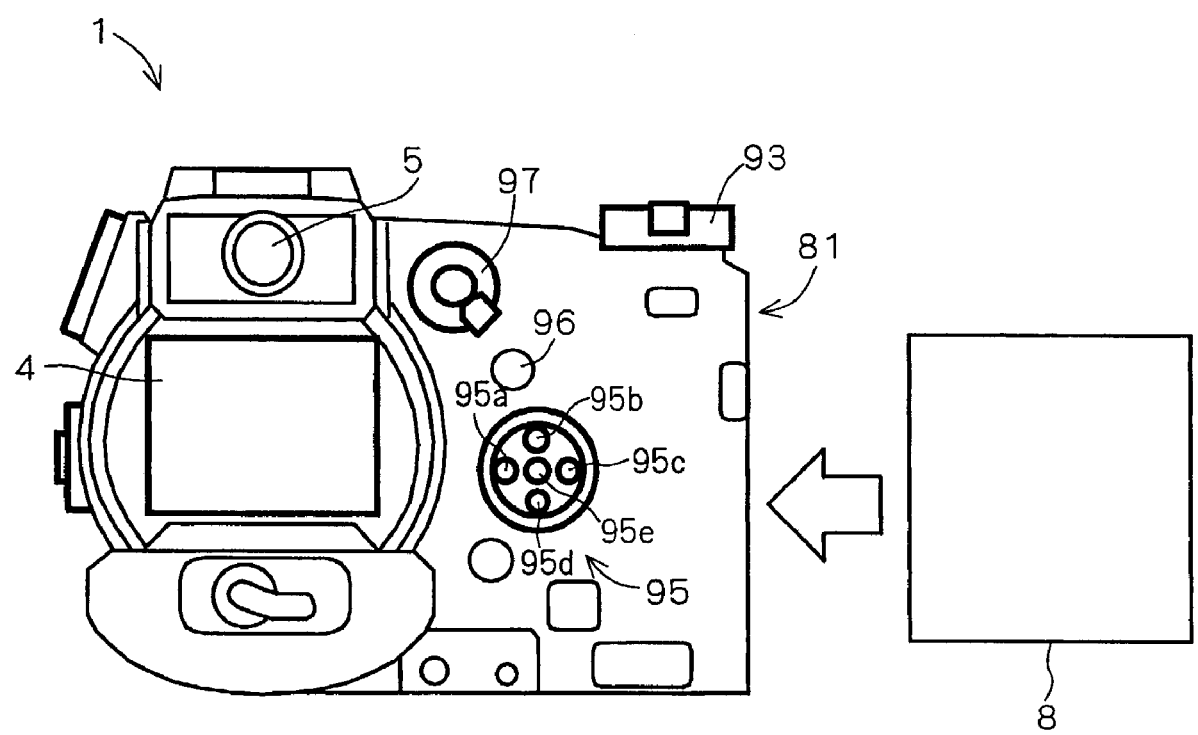
FIG. 3 is a rear view showing the appearance of the image capturing apparatus.

First, a preferred embodiment of an image capturing apparatus will be described. FIGS. 1, 2, and 3 are a front view, a top view, and a rear view, respectively, each showing appearance of an image capturing apparatus 1. The diagrams are not always according to triangulation but aim at conceptually illustrating the configuration of the image capturing apparatus 1.

The image capturing apparatus 1 functions as a so-called digital camera and is constructed so as to be able to generate image data by photographing a subject. As shown in FIG. 2, a taking lens 3 with a macro function as an image capturing optical system is provided on the front face side of the image capturing apparatus 1. The taking lens 3 has a zooming function. For example, by turning a zoom ring 91 by manual operation, the magnification at the time of photographing can be changed. On the top face side of the taking lens 3, a macro switching lever 92 is provided which can switch photographing between macro photographing and normal photographing.

A shutter button 9 for instructing photographing is provided on the top face of the image capturing apparatus 1. The shutter button 9 takes the form of a two-stage switch capable of detecting a touched state (hereinafter, referred to as S1 state) and a depressed state (hereinafter, referred to as S2 state) so as to be discriminated from each other. When the shutter button 9 is set in the S1 state in the image capturing mode, the image capturing apparatus 1 starts an image capturing preparing operation of automatic exposure (AE) control or automatic focusing (AF) control. When the shutter button 9 is set in the S2 state, the image capturing apparatus 1 starts image capturing operation for generating an image for recording.

On the top face of the image capturing apparatus 1, a mode switching dial 93 for switching and setting a mode among "image capturing mode", "reproducing mode" and "setting mode" is provided.

The image capturing mode is a mode of recording image data obtained at the time of photographing. The reproducing mode is a mode of reproducing the image data recorded on a memory card 8 and displaying the reproduced image data onto a display device such as an LCD 4 or an EVF 5. The setting mode is a mode of displaying a setting menu screen on the LCD 4 or the like and allowing the user to make various functional settings of the image capturing apparatus 1 by, for example, selecting a desired movement correcting process (auto stabilization process) from a plurality of movement correcting processes on the basis of the setting menu screen. For this purpose, turn-on and turn-off of the movement correction mode can be switched in the setting mode.

On the top face of the image capturing apparatus 1, a display unit 94 for displaying a setting state of the correcting mode which is set in the setting mode is provided.

As shown in FIG. 3, in a left portion of the rear face of the image capturing apparatus 1, the liquid crystal display (LCD) 4 and the electronic view finder (EVF) 5 are provided as display devices for displaying the setting menu screen, performing live view display of displaying a moving image of the subject in a real-time manner in an image capturing standby state until an image capturing instruction is given in the image capturing mode, displaying an after view by which the user checks an image obtained by the image capturing operation in the case where the image capturing instruction is given, reproducing and displaying a recorded image, and the like. Each of the LCD 4 and EVF 5 has, for example, 640×480 display pixels and can display a color image.

In the right portion of the rear face of the image capturing apparatus 1, a control button 95 including cursor buttons (cross key) 95a, 95b, 95c, and 95d and an execution button 95e is provided. By using the control button 95, various setting operations are performed. On the rear face of the image capturing apparatus 1, a menu button 96 is provided. By depressing the menu button 96 by the user, various menu screens are displayed on the LCD 4.

On the rear face of the image capturing apparatus 1, a display switching lever 97 is provided. By operating the display switching lever 97, an image is displayed on the LCD 4 or EVF 5.

In a side face of the image capturing apparatus 1, a memory slot 81 into which the memory card 8 for recording image data or the like can be inserted is provided. The memory card 8 is a recording medium such as a semiconductor memory or a small magnetic disk. By inserting the memory card 8 into the memory slot 81, image data obtained at the time of photographing is recorded on the memory card 8.

Figure 4:
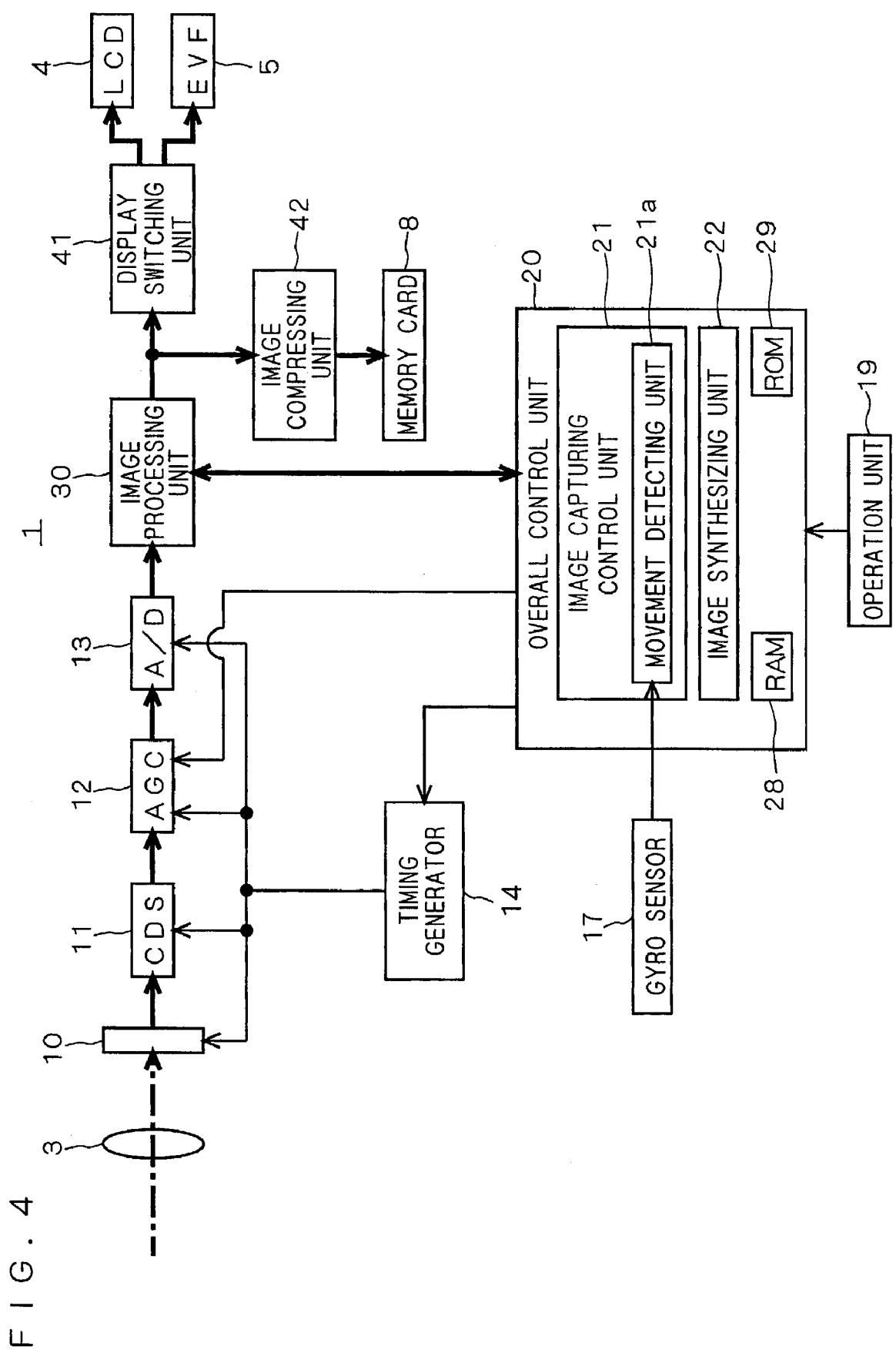
FIG. 4 is a block diagram showing internal functions of the image capturing apparatus.

FIG. 4 is a block diagram showing internal functions of the image capturing apparatus 1.

The image capturing apparatus 1 includes an image capturing device 10 constructed by a CCD image sensor which is provided on the rear side of the taking lens 3. The image capturing device 10 photoelectrically converts a subject's image received via the taking lens 3 pixel by pixel, thereby generating an image signal. On the photosensitive face of the image capturing device 10, for example, 2560× 1920 pixels are arranged two-dimensionally and primary color transmission filters of R, G, and B are disposed in a checkered pattern on a pixel unit basis.

A signal stored in each pixel by exposure of the image capturing device 10 to light is subjected to a read control by a timing generator 14. Specifically, the image capturing device 10 sequentially outputs the signals stored in the pixels to a CDS (Correlated Double Sampling) circuit 11 on the basis of control signals from the timing generator 14. By a collection of pixel signals, image signals of one frame are generated.

For the image capturing device 10, as image signal reading modes, a draft mode and an all-pixel reading mode can be set. For example, when the draft mode is set as the reading mode of the image capturing device 10, image signals are outputted from the image capturing device 10 while reducing the pixels. In contrast, when the all-pixel reading mode is set as the reading mode of the image capturing device 10, image signals constructed by pixel signals stored in all of the pixels of the image capturing device 10 are outputted.

From the image signal which is photoelectrically converted by the image capturing device 10, noise components are removed by the CDS circuit 11. In an AGC (Auto Gain Control) circuit 12, a gain instructed by an overall control unit 20 is applied and the image signal is amplified. The image signal amplified by the AGC circuit 12 is supplied to an A/D converter 13 and converted to, for example, a digital signal expressed in 12 bits pixel by pixel. Image data outputted from the A/D converter 13 is supplied to an image processing unit 30.

The image capturing device 10, CDS circuit 11, AGC circuit 12, and A/D converter 13 are controlled by the timing generator 14 and perform synchronized operations.

The image processing unit 30 performs, as will be described later, various image processes on image data inputted from the A/D converter 13. Image data inputted to the image processing unit 30 has information regarding color components of R, G, and B. The image processing unit 30 performs a color space converting process and outputs image data expressing a color image by a luminance component (luminance information) and a color difference component (color information).

Image data outputted from the image processing unit 30 is supplied to a display switching unit 41 or an image compressing unit 42. For example, in the case of displaying an image, image data outputted from the image processing unit 30 is supplied to the display switching unit 41 and image data is outputted to the LCD 4 or EVF 5 on the basis of a set state of the display switching lever 97. On the other hand, in the case of recording an image, image data outputted from the image processing unit 30 is supplied to the image compressing unit 42 and subjected to a predetermined encoding process in the image compressing unit 42, and the encoded image data is recorded on the memory card 8.

A gyro sensor 17 detects displacement of the image capturing apparatus 1 and detects a movement direction and a movement amount of the image capturing apparatus 1. Therefore, the gyro sensor 17 can detect a blur at the time of photographing, the movement direction of the image capturing apparatus 1 indicates a blur direction and the movement amount indicates a blur amount. The information obtained by the gyro sensor 17 is outputted to the overall control unit 20.

An operation unit 19 includes the shutter button 9 and other buttons and switches. An operation to the operation unit 19 is converted to an electric signal and the electric signal is inputted to the overall control unit 20.

Figure 5:
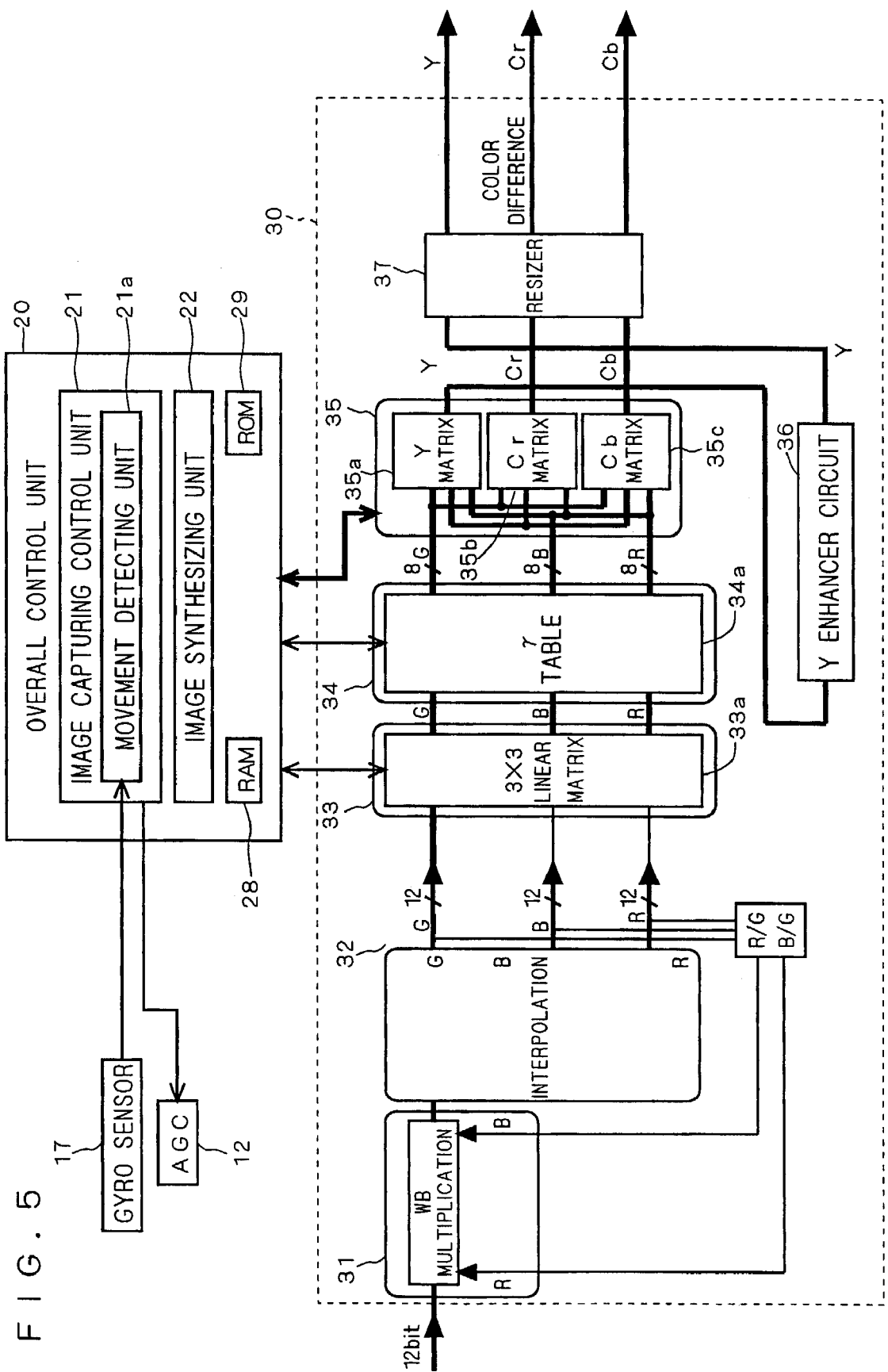
FIG. 5 is a diagram showing a detailed configuration of an image processing unit.
Figure 6:
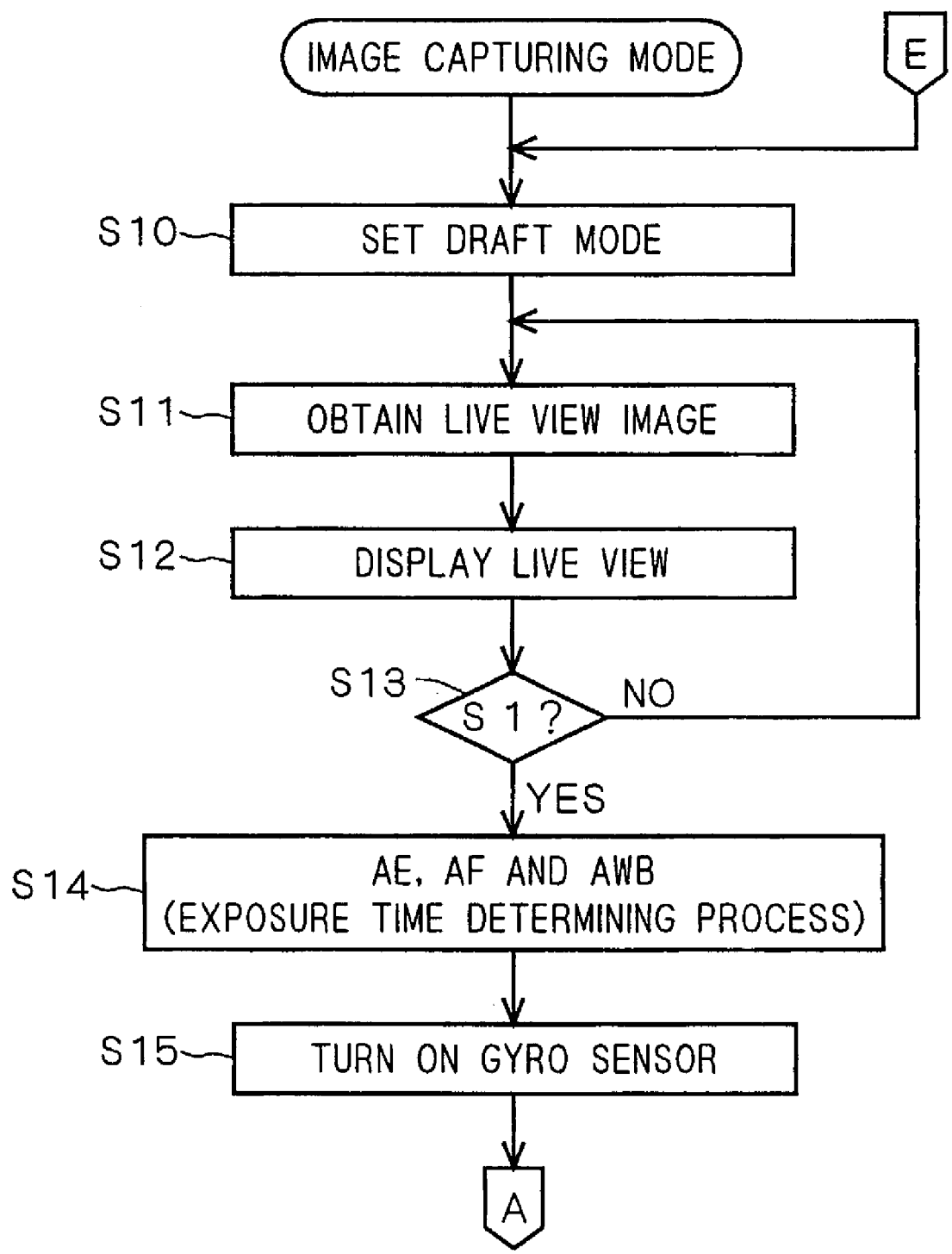
FIG. 6 is a flowchart showing a processing sequence in the image capturing apparatus in an image capturing mode.

The details of the image processing unit 30 will now be described. FIG. 5 is a diagram showing the detailed configuration of the image processing unit 30. To the image processing unit 30, image data expressed in 12 bits per pixel generated by the A/D converter 13 is inputted.

A WB (White Balance) multiplier 31 performs white balance correction. By interpolating a pixel of R, G, and B by an interpolation circuit 32, three-channel data of R, G, and B is generated. That is, each pixel comes to have information of the color components of all of R, G, and B by the pixel interpolation. Image data of R, G, and B generated by the interpolation circuit 32 is sequentially inputted to a color conversion matrix circuit 33, a γ correction circuit 34, and a color conversion circuit 35, and a variable color matching process is performed according to reproduction characteristics of a reproduction device. Concretely, the color conversion matrix circuit 33 executes color conversion matrix computation by a 3×3 linear matrix 33a on each image data of the R, G, and B generated by the interpolation circuit 32. After executing the color conversion matrix computation, each of the images of R, G, and B is subjected to tone correction adapted to the reproduction device or the like with a γ table 34a corresponding to γ correction information in the γ correction circuit 34. The γ correction circuit 34 concurrently performs tone conversion by reducing an input signal of 12 bits to 8 bits.

After the γ correction, in the color conversion circuit 35, matrix computation using color difference matrixes 35a, 35b, and 35c is performed. By the computation, a color image expressed in the R, G, and B is converted to a color image expressed in Y, Cr, and Cb, and image information included in the image data is separated into the luminance signal Y and color difference signals Cr and Cb. The luminance signal Y here denotes information (luminance information) indicative of brightness of an image, and each of the color difference signals Cr and Cb is color information indicative of a color component of an image by a color difference. Conceptually, therefore, a color image of one frame is expressed by a collection of an image of the Y component, an image of the Cr component, and an image of the Cb component.

The luminance signal Y is split into frequency bands in a Y enhancer circuit 36. On the high frequency side of the luminance signal Y, contour correction and noise suppression are performed by adjustment of signal level and a base clip process. After that, a high-frequency-side luminance signal and a low-frequency-side luminance signal are added to each other and the corrected luminance signal Y obtained by the addition is inputted to a resizer circuit 37.

In the resizer circuit 37, the Y, Cr, and Cb signals are properly subjected to a resolution converting process (reducing process) of each channel in accordance with an internal state (operation state) of the image capturing apparatus 1. For example, in the case of displaying a live view in an image capturing standby state, an image is resized so as to be adapted to a display size of 640×480 pixels of the display device (LCD 4 or EVF 5), and the resized image data is outputted to the display switching unit 41.

As described above, the image processing unit 30 performs image processes such as adjustment of white balance, pixel interpolation, color conversion, and size-reduction. The 3×3 linear matrix 33a, γ table 34a, and color difference matrixes 35a, 35b, and 35c applied to the color conversion matrix 33, γ correction circuit 34, and color conversion circuit 35, respectively, are designated by the overall control unit 20. Further, the color conversion circuit 35 can transmit/receive image data to/from the overall control unit 20. Specifically, the color conversion circuit 35 can supply image data of Y, Cr, and Cb obtained from image data of R, G, and B to the overall control unit 20. The color conversion circuit 35 can also receive image data generated by the overall control unit 20 and transmit the image data to a processing unit at the post stage.

The overall control unit 20 is constructed by, for example, a CPU having therein a RAM and a ROM 29. When the CPU executes a predetermined program stored in the ROM 29, the overall control unit 20 functions as an image capturing control unit 21 for controlling the image capturing operation in a centralized manner and an image synthesizing unit 22 for generating an image while reducing the influence of a movement in the case where a movement occurs.

The image capturing control unit 21 controls operation of the components in the image capturing mode. For example, in an image capturing standby state before the shutter button 9 is depressed, the image capturing control unit 21 sets the draft mode as the reading mode of the image capturing device 10 and controls so as to repeat operation of obtaining and displaying an image for live view display. When the shutter button 9 is set in the S1 state, the image capturing control unit 21 controls the image capturing preparing operation. Further, when the shutter button 9 is set in the S2 state, the image capturing control unit 21 changes the setting of the reading mode of the image capturing device 10 to the all-pixel reading mode and controls the image capturing operation for generating a high-resolution recording image.

The image capturing control unit 21 also functions as a movement detecting unit 21a and monitors a movement state of the image capturing apparatus 1 in the image capturing mode. When the movement correcting mode is ON in the image capturing apparatus 1, the image capturing control unit 21 stores the latest live view image obtained in the image capturing standby state or image capturing preparing state in the RAM 28. Although one frame of the live view image stored in the RAM 28 is sufficient, to excellently improve the S/N ratio of the recording image, it is preferable that live view images of a plurality of frames be stored in the RAM 28.

When the movement amount inputted from the gyro sensor 17 becomes a predetermined amount or larger during exposure of the image capturing device 10 for capturing a recording image, the exposure of the image capturing device 10 is stopped. It prevents a recording image from being blurred. On the other hand, by stopping the exposure of the image capturing device 10 in the middle, an image captured after that is obtained with insufficient exposure. The image capturing control unit 21 therefore increases the gain applied in the AGC circuit 12 to compensate the insufficient exposure. Since noise components are also amplified at this time, in the preferred embodiment, an image process to suppress the noise components is performed in the overall control unit 20. The image process is performed by the image synthesizing unit 22 in the overall control unit 20.

The image synthesizing unit 22 combines color information of the live view image stored in the RAM 28 in the image capturing standby state to the image captured by the image capturing operation, thereby reducing the noise components included in the color information.

The processing sequence of the image capturing apparatus 1 in the image capturing mode will be concretely described hereinafter.

FIGS. 6 to 9 are flowcharts showing a processing sequence in the image capturing apparatus 1 in the image capturing mode and show the case where the movement correction mode is set in the on state in the image capturing apparatus 1.

When the image capturing mode is set, the image capturing control unit 21 sets the draft mode as the reading mode of the image capturing device 10 (step S10). By setting the draft mode as the reading mode, efficient image reading operation can be performed and images can be obtained at high frame rate at the time of displaying a live view.

The image capturing control unit 21 starts the operation of obtaining a live view image (step S11) and starts displaying a live view on the LCD 4 or EVF 5 (step S12). Such a live view display is repeatedly performed. When the shutter button 9 is set in the S1 state, the image capturing preparing operation is started (YES in step S13).

In the S1 state, the image capturing control unit 21 executes an automatic exposure (AE) control, an automatic focus (AF) control, an AWB (Automatic White Balance) control and the like on the basis of the live view image obtained at that time point. Particularly, in the automatic exposure control, exposure time (shutter speed) of the image capturing device 10 is determined so as to obtain an image with proper exposure at the time of performing the operation of capturing the image for recording (step S14).

The image capturing control unit 21 turns on the gyro sensor 17 (step S15). In the image capturing control unit 21, the movement detecting unit 21a functions and the operation for monitoring the movement state of the image capturing apparatus 1 is started.

Figure 7:
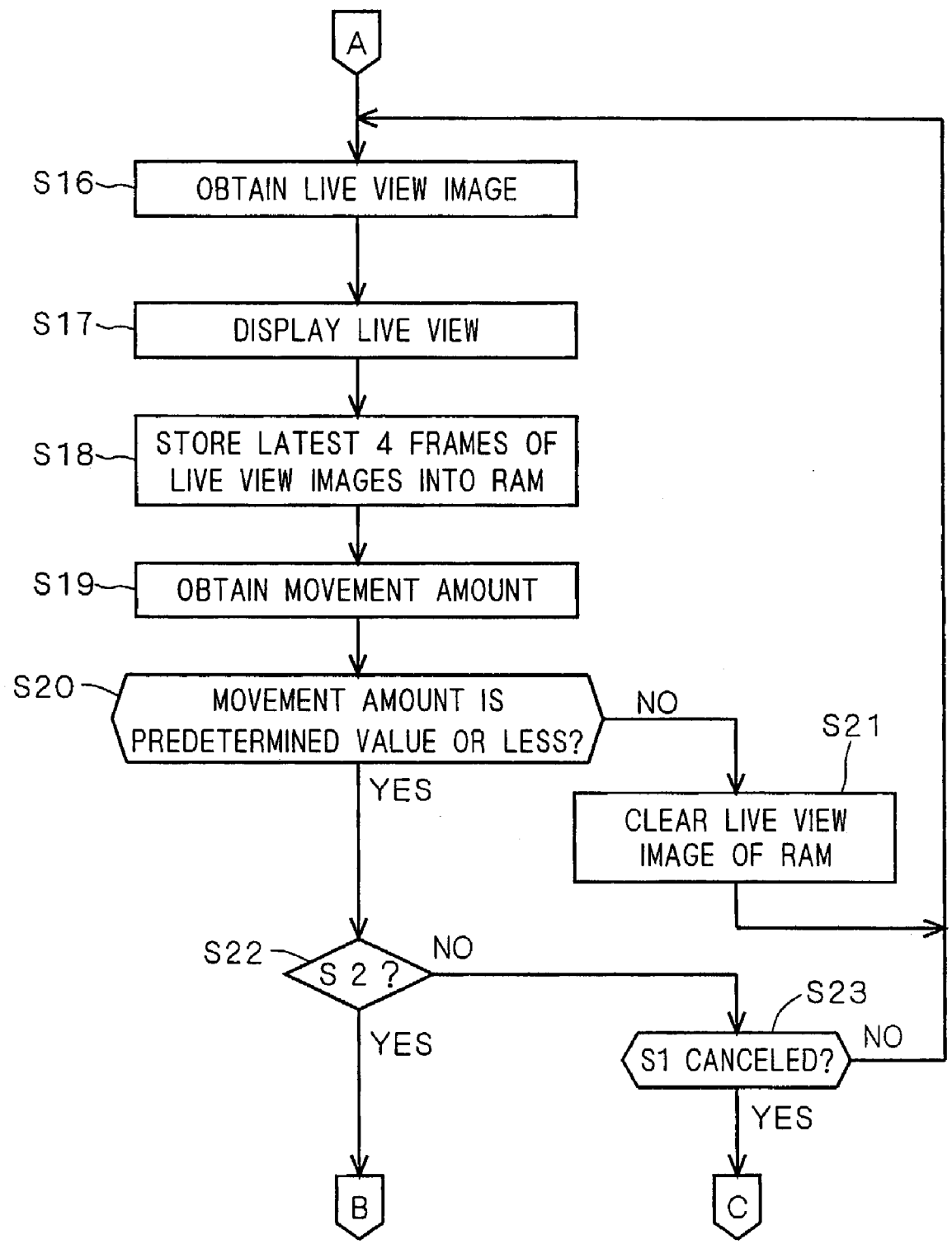
FIG. 7 is a flowchart showing a processing sequence in the image capturing apparatus in the image capturing mode.

The program advances to the flowchart of FIG. 7 and performs an operation of obtaining a live view image (step S16) and an operation of displaying the live view on the LCD 4 or EVF 5 (step S17) so as to continue the live view display on the LCD 4 or EVF 5 also in the image capturing preparing state.

The image capturing control unit 21 obtains live view images sequentially generated by the image processing unit 30 and sequentially stores them into the RAM 28 (step S18). For example, an area for storing live view images of four frames is set in the RAM 28 and the image capturing control unit 21 stores the live view images of the latest four frames into the RAM 28.

The movement detecting unit 21a obtains information regarding the movement amount from the gyro sensor 17 (step S19). The movement amount obtained at this time is used for movement determination in step S20. The information regarding the movement amount and the movement direction is stored in the RAM 28 so as to be associated with the live view image stored in the RAM 28 in step S18.

The movement detecting unit 21a determines whether the movement amount in step S19 is equal to or smaller than a predetermined value V2 (step S20).

The live view image stored in the RAM 28 is an image for correcting color information of a captured image in the case where a movement occurs at the time of obtaining a captured image. Consequently, when the state in the image capturing operation largely changes from the state where the live view image is obtained, precision of correction using the live view image deteriorates. Therefore, when the movement amount is larger than the predetermined value V2 in step S20, by deleting all of live view images stored in the RAM 28, the storage state of the RAM 28 is cleared (step S21). The processes in step S16 and thereafter are repeatedly performed, thereby storing the live view images of the latest four frames again in the RAM 28 (steps S16 to S18).

When the movement amount is smaller than the predetermined value V2, the image capturing control unit 21 determines whether the shutter button 9 shifts to the S2 state or not (step S22). If the shutter button 9 has not shifted to the S2 state, the image capturing control unit 21 determines whether the S1 state has been canceled or not (step S23). When the shutter button 9 is continuously in the S1 state, the processes of steps S16 to S23 are repeatedly executed and live view images of the latest four frames are stored in the RAM 28.

Figure 8:
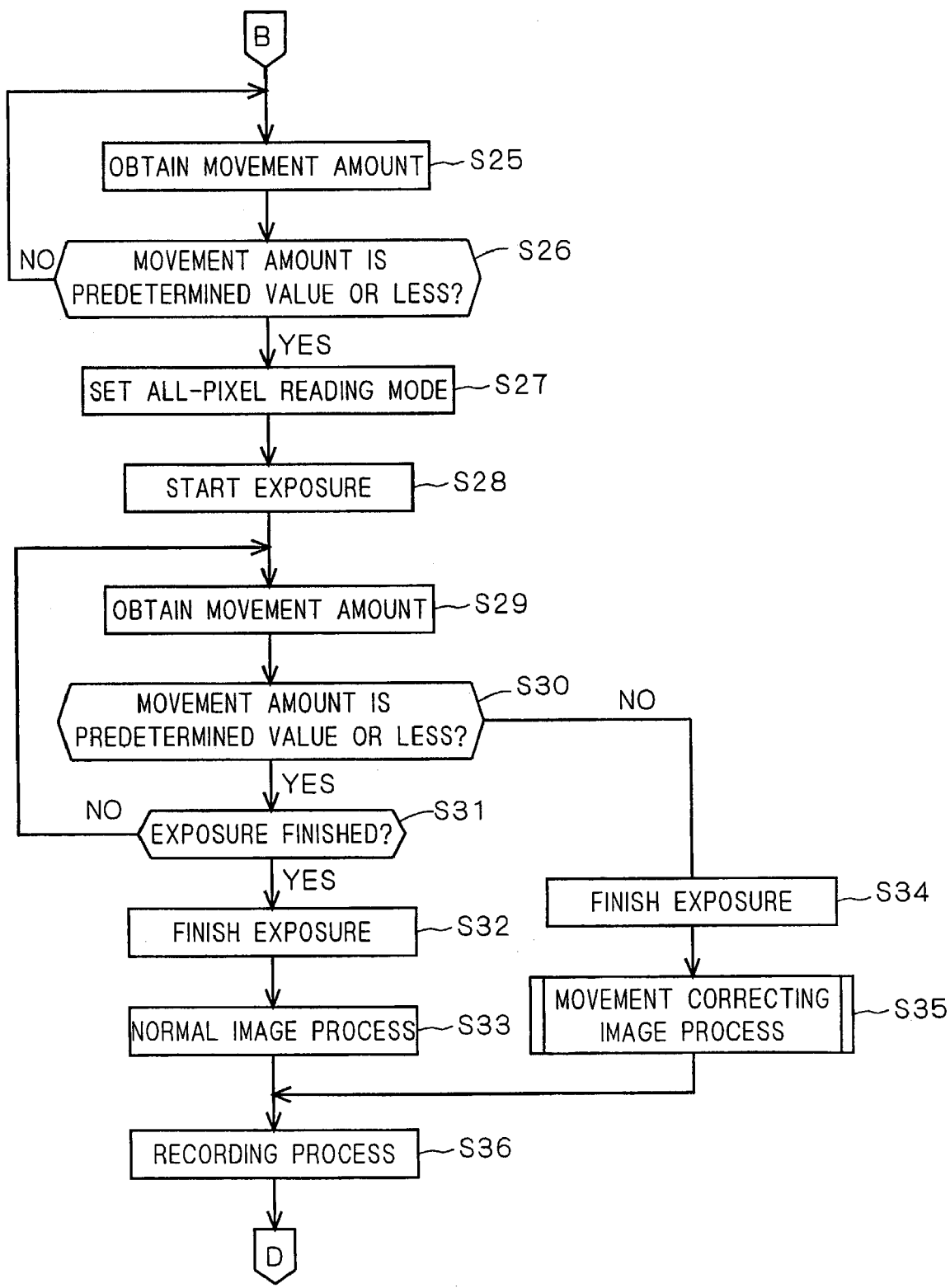
FIG. 8 is a flowchart showing a processing sequence in the image capturing apparatus in the image capturing mode.

When the shutter button 9 shifts to the S2 state (YES in step S22), the program advances to the flowchart of FIG. 8. The movement detecting unit 21a obtains information regarding the movement amount again from the gyro sensor 17 (step S25) and determines whether the movement amount is equal to or smaller than the predetermined value V1 (V1<V2) (step S26). The progress of the procedure is stopped until the movement amount becomes equal to or smaller than the predetermined value V1 and the exposure operation of the image capturing device 10 is not started. In other words, even when the shutter button 9 is depressed to the S2 state by the user, the image capturing apparatus 1 does not start the operation of capturing an image for recording until the framing enters a stable state in which the movement amount is relatively small, thereby suppressing occurrence of a blur in a captured image.

When the movement amount becomes equal to or smaller than the predetermined value V1 (YES in step S26), the image capturing control unit 21 changes the setting of the reading mode of the image capturing device 10 to the all-pixel reading mode, thereby setting a state in which a high-resolution image can be captured (step S27).

The image capturing control unit 21 starts exposing the image capturing device 10 to light (step S28). During exposure of the image capturing device 10 for obtaining an image for recording, the movement detecting unit 21a sequentially obtains the information regarding the movement amount from the gyro sensor 17 (step S29) and determines whether the movement amount is equal to or smaller than the predetermined value V1 or not (step S30).

If the stable framing state in which the movement amount is equal to or smaller than the predetermined value V1 is continued, exposure of the image capturing device 10 to light is continued until the exposure time obtained in the automatic exposure control (step S14) is elapsed (a loop of steps S29, S30, and S31). When the exposure time obtained at the time of the automatic exposure control is elapsed, the exposure is finished (step S32), a normal image process for an image for recording is performed (step S33) and the process of recording the image onto the memory card 8 is carried out (step S36). The normal image process is an image process of generating an image for recording only by captured images of one frame obtained by exposing the image capturing device 10 to light. The image data obtained from the image capturing device 10 is only subjected to the series of image processes described in the image processing unit 30, and the process of combining with a live view image is not performed.

On the other hand, when the movement amount becomes larger than the predetermined value V1 during exposure of the image capturing device 10 to light for obtaining an image for recording (NO in step S30), the exposure is finished at that time point (step S34). It can prevent an influence of the movement from exerting on an image stored in the image capturing device 10.

The movement correcting image process is executed in the image capturing apparatus 1 (step S35). Specifically, the gain of the AGC circuit 12 is increased and image data obtained is supplied to the overall control unit 20 via the image processing unit 30. The overall control unit 20 stores the image data captured in such a manner into the RAM 28 and also stores information regarding the movement amount and the movement direction detected during the exposure into the RAM 28 so as to be associated with the captured image data. An image synthesizing process between the captured image and the live view image stored before in the RAM 28 is executed by the image synthesizing unit 22 so as not to make noise components conspicuous. An image for recording generated by the image synthesizing process is supplied from the overall control unit 20 to the image processing unit 30 and, after that, recorded into the memory card 8 (step S36).

Figure 9:
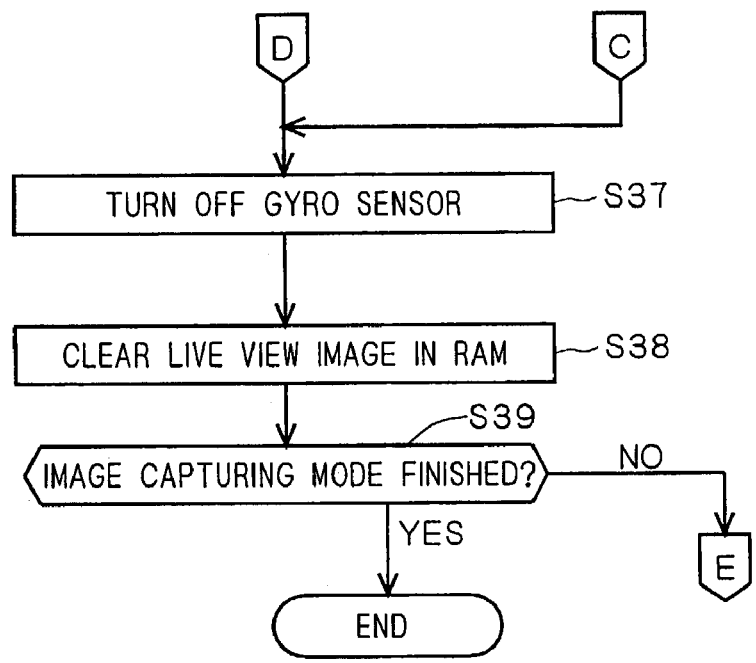
FIG. 9 is a flowchart showing a processing sequence in the image capturing apparatus in the image capturing mode.

The program moves to the flowchart of FIG. 9. The image capturing control unit 21 turns off the gyro sensor 17 (step S37), deletes the live view image stored in the RAM 28, and clears the stored state of the RAM 28 (step S38). When an operation of finishing the image capturing mode is performed, the process in the image capturing mode is finished. When the finishing operation is not performed, the image capturing control unit 21 repeatedly performs the processes in step S10 and thereafter and returns to the image capturing standby state for the next photographing (step S39).

In the case where the S1 state of the shutter button 9 is canceled in step S23 (in the case where the shutter button 9 is not operated at all), the processes in steps S37 to S39 performed. In the case of continuing the image capturing mode, the processes in step S10 and thereafter are repeatedly performed.

Figure 10:
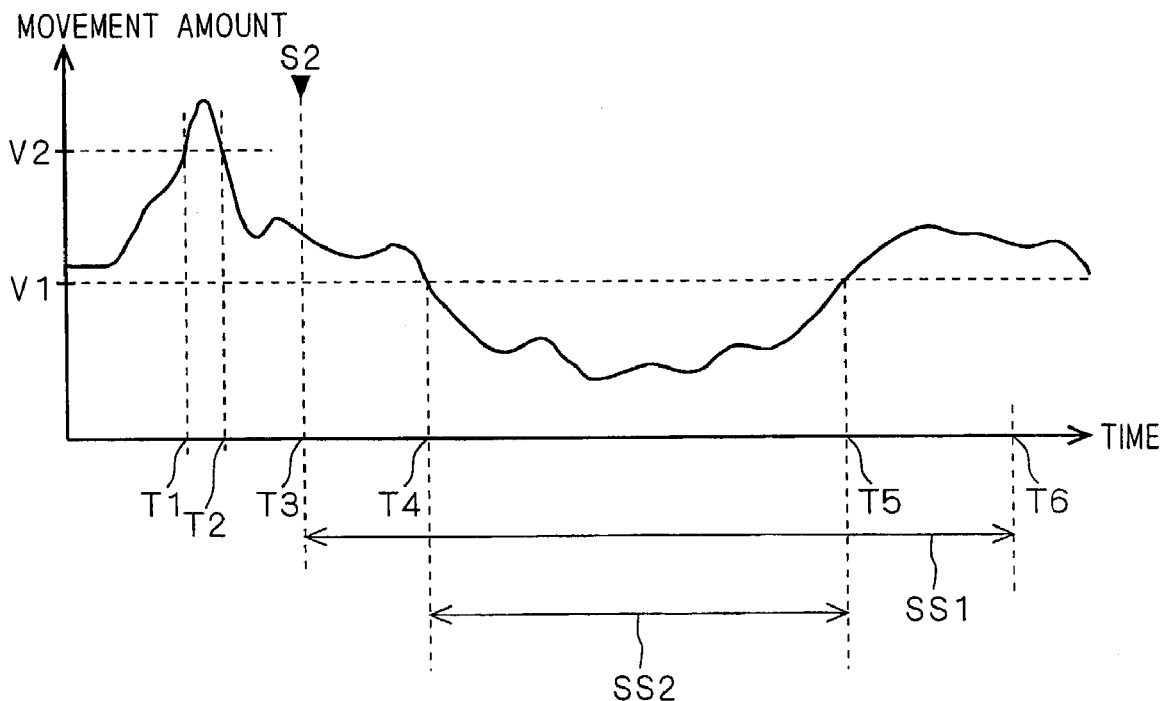
FIG. 10 is a timing chart regarding exposure in the image capturing mode.

FIG. 10 is a timing chart showing exposure performed in the image capturing mode by the processing sequence as described above. FIG. 10 shows a case where the shutter button 9 shifts to the S2 state at time T3.

Before the shutter button 9 enters the S2 state, acquisition of a live view image is continuously performed every predetermined time in the image capturing apparatus 1, and live view images of the latest four frames are stored in the RAM 28. In th case where the movement amount of the image capturing apparatus 1 exceeds the predetermined value V2 at time T1, all of live view images of four frames stored in the RAM 28 are erased. After the movement amount becomes equal to or smaller than the predetermined value V2, live view images of the latest four frames are stored again in the RAM 28. By the operation of storing the live view images, the latest live view images obtained almost in the same state as that in the image capturing operation for capturing images for recording are stored into the RAM 28.

At time T3, the shutter button 9 is operated to the S2 state. In the case where the movement correcting mode is off, the exposure time of the image capturing device 10 the time SS1 obtained by automatic exposure (AE) control.

In contrast, when the movement correcting mode is on, exposure of the image capturing device 10 is not started immediately after shift to the S2 state but the exposure is started after the movement amount of the image capturing apparatus 1 becomes equal to or smaller than the predetermined value V1 and stable. In FIG. 10, exposure of the image capturing device 10 is started from time T4. The image capturing device 10 is exposed to light during the exposure time SS1 obtained by the automatic exposure (AE) control and during the movement amount is equal to or smaller than the predetermined value V1. In other words, even if the exposure time SS1 in which proper exposure is obtained is not elapsed, when the movement amount of the image capturing apparatus 1 exceeds the predetermined value V1, the exposure is stopped. Therefore, in the case where the movement correcting mode is on, when a movement occurs during exposure in the image capturing operation, exposure time SS2 becomes shorter than the exposure time SS1 for obtaining an image with proper exposure. An image obtained in the exposure time SS2 is an image onto which a smaller influence of a movement is exerted.

In order to compensate short of exposure to an image obtained in the exposure time SS2, a signal is amplified with a gain larger than a normal gain in the AGC circuit 12, and image data converted to image data of Y, Cr, and Cb by the image processing unit 30 is supplied to the overall control unit 20.

Figure 11:
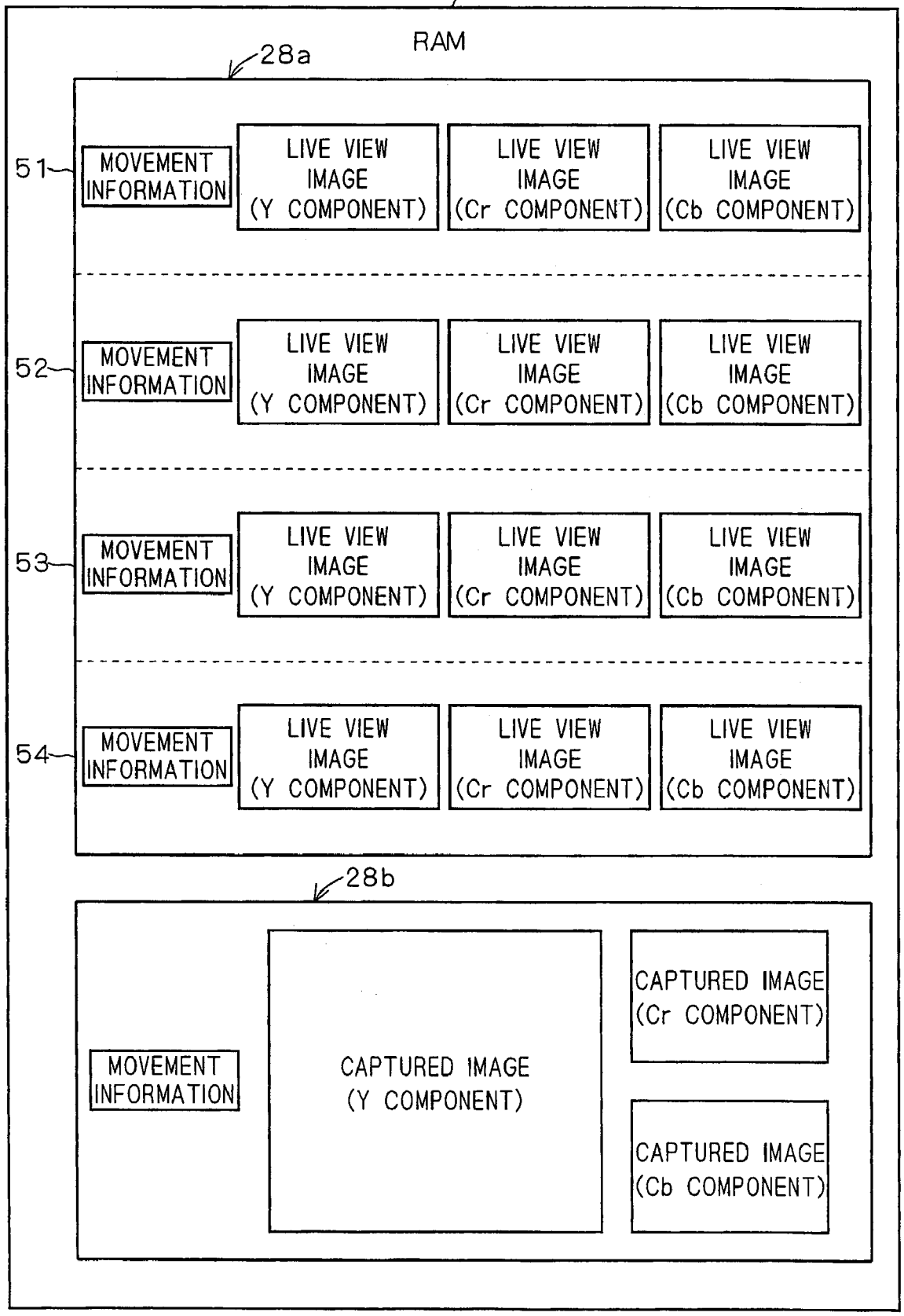
FIG. 11 is a diagram showing an example of data stored in an RAM.

Therefore, when exposure of the captured image is interrupted, data as shown in FIG. 11 is stored into the RAM 28 of the overall control unit 20. Specifically, in the RAM 28, a live-view image storing area 28a for storing a live view image and a captured image storing area 28b for storing a captured image obtained by the image capturing operation for capturing an image for recording are specified. In each of areas 51, 52, 53, and 54 of the live-view image storing area 28a, live view images just before the shutter button 9 enters the S2 state and movement information at the time of obtaining the live view images are stored. In the captured image storing area 28b, a captured image and movement information at the time of obtaining the captured image are stored. Since image data of Y, Cr, and Cb generated by the color conversion circuit 35 is inputted to the overall control unit 20, for each image, an image of the Y component, an image of the Cr component, and an image of the Cb component are stored in the RAM 28.

Since the live view image is an image obtained in the draft mode, each of the images of Y, Cr, and Cb components of the live view image has, for example, the image size of 640×480 pixels. In contrast, the captured image is an image obtained in the all-pixel reading mode. For example, an image of the Y component of the captured image has an image size of 2560×1920 pixels, and each of images of the Cr and Cb components has an image size of 1280×960 pixels.

Figure 12:
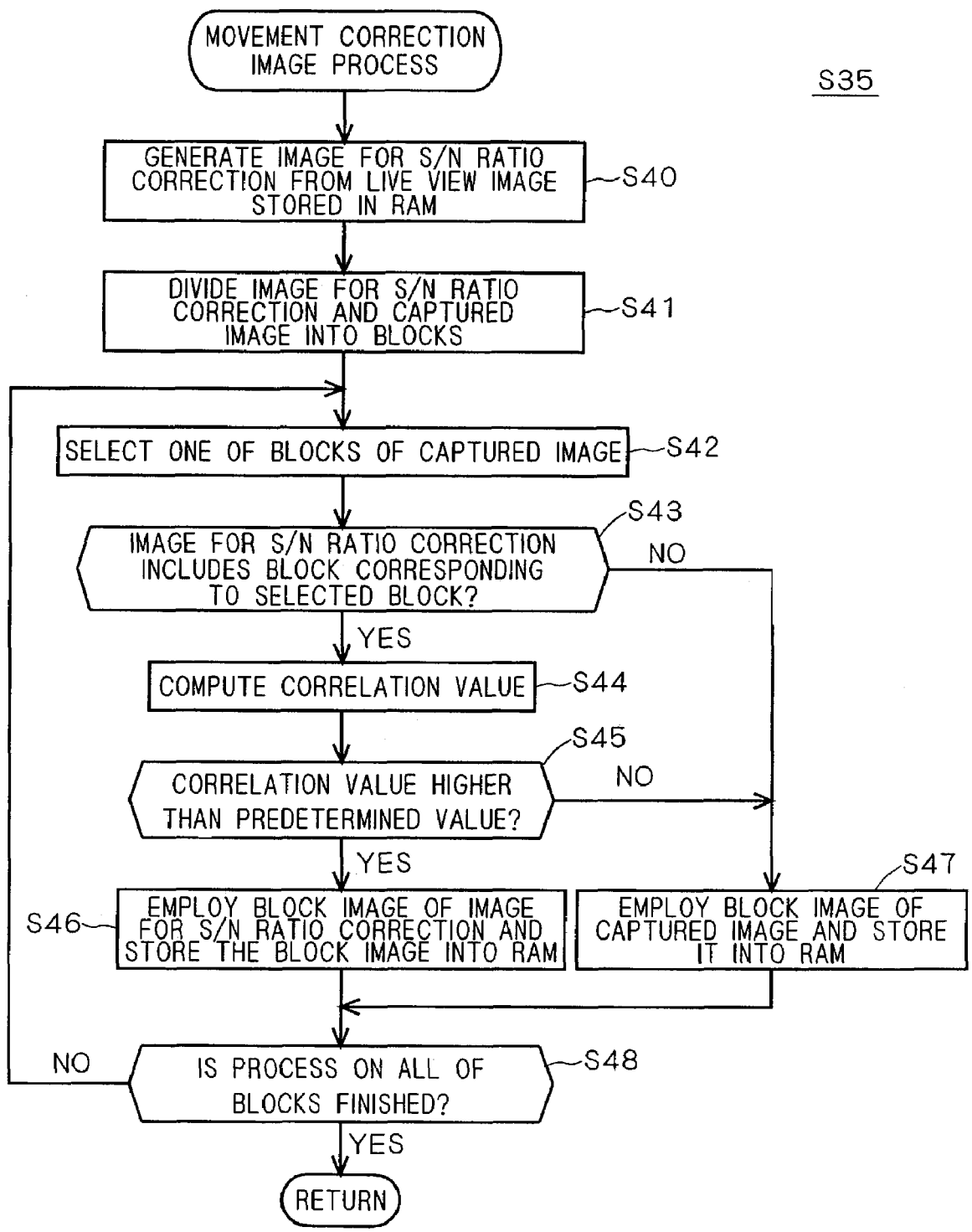
FIG. 12 is a flowchart showing the details of a movement correcting image process.

The movement correction in the overall control unit 20 will be described in detail hereinafter. FIG. 12 is a flowchart showing the details of the movement correction image process in step S35 of the flowchart. The process is performed mainly by the image synthesizing unit 22 in the overall control unit 20.

When the movement correction image process is started, the image synthesizing unit 22 generates an image for S/N ratio correction from the live view image stored in the RAM 28 (step S40). The image for correcting the S/N ratio is an image for correcting color information of the captured image from the live view image. The image for S/N ratio correction is generated for each of the Cr component and the Cb component.

A method of generating an image for S/N ratio correction will be concretely described hereinafter.

The image size of a live view image of the Cr component and the Cb component stored in the RAM 28 is smaller than that of the Cr component and the Cb component of a captured image. Consequently, in a process of generating an image for S/N ratio correction, first, as shown in FIGS. 13 and 14, an enlarging process is performed on each of a Cr component image and a Cb component image of a live view image stored in the RAM 28 so that the size of the Cr component image and the Cb component image become the same as the size of the Cr component image and the Cb component image of the captured image. The process is executed on all of live view images of four frames stored in the RAM 28. As a result, the Cr component image and the Cb component image of each live view image come to have the same size as that of the Cr and Cb component images of the captured image.

On the basis of the movement information associated with each live view image, the Cr components of each of the live view images are combined to generate a Cr component of an image for S/N ratio correction. Assuming now that, as shown in FIG. 15, the image capturing apparatus 1 is displaced by a predetermined amount each in the α direction at the time of sequentially obtaining live view images 51a, 52a, 53a, and 54a, the image synthesizing unit 22 disposes the Cr component image of each live view image in the α direction in accordance with the movement amount. The hatched portions in FIG. 15 are portions in which the live view images of four frames are not overlapped with each other. By averaging the Cr component signals with respect to the overlapped portions of the live view images of the four frames, the image synthesizing unit 22 generates a Cr component image 55 for an image for S/N ratio correction. However, with respect to the portions where images of all frames are not overlapped, the image synthesizing unit 22 generates a Cr component image 55 for an image for S/N ratio correction without averaging. Consequently, in the Cr component image 55 of the image for S/N ratio correction shown in FIG. 15, the Cr component information is not included in a hatched image peripheral portion.

Similar processes are performed with respect to the Cb component, thereby generating the Cb component image of the image for S/N ratio correction.

Figure 16:
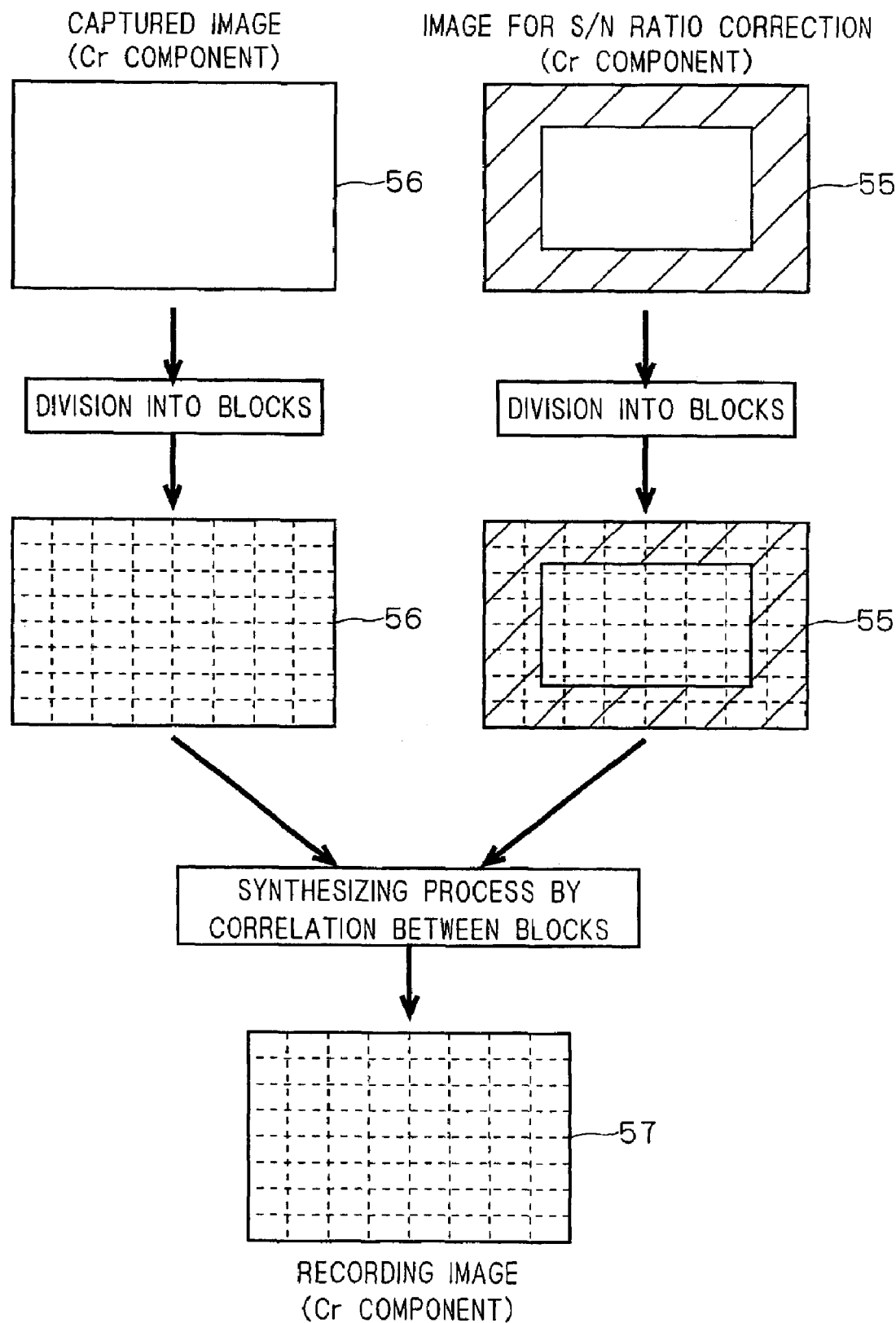
FIG. 16 is a diagram showing the concept of process of generating a recording image on the basis of an image for S/N ratio correction and a captured image.

The image for S/N ratio correction generated in such a manner is temporarily stored in the RAM 28, and processes in step S41 and thereafter are performed. FIG. 16 is a diagram showing concept of the processes in step S41 and thereafter that an image 57 for recording is generated on the basis of the image 55 for S/N ratio correction and a captured image 56.

The image synthesizing unit 22 divides each of the Cr component and the Cb component of the image for S/N ratio correction and the Cr component and the Cb component of the captured image into blocks (step S41).

In steps S42 to S48, a correlation value between a Cr component of the image for S/N ratio correction and a Cr component of the captured image is obtained on a block unit basis. When the correlation value is high, the Cr component of the image for S/N ratio correction is employed as the Cr component of the image for recording. In such a manner, the Cr component image of the image for recording is determined. Similarly, the correlation value between the Cb component in the image for S/N ratio correction and the Cb component of the captured image is obtained on a block unit basis. When the correlation value is high, the Cb component of the image for S/N ratio correction is employed as the Cb component of the image for recording. In such a manner, the Cb component image of the image for recording is determined.

Such a process will be described more concretely. The image synthesizing unit 22 selects one of the blocks obtained by dividing the captured image (step S42) and determines whether a corresponding block exists in the image for S/N ratio correction or not (step S43). Since valid color information does not exist in the peripheral portion of the image for S/N ratio correction, there is the possibility that the block corresponding to the block selected in the captured image does not exist. Consequently, in the case where the corresponding block does not exist in the image for S/N ratio correction, the program advances to step S47. In the case where the corresponding block exists, the program advances to step S44.

Figures 17, 18, 19:
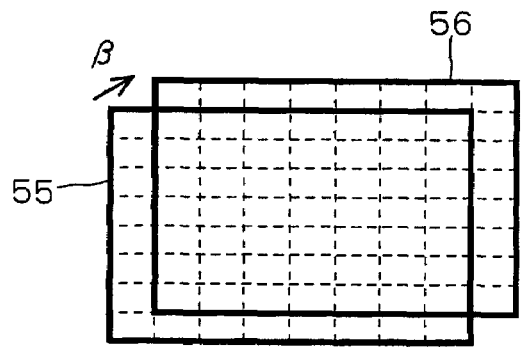
FIG. 17 is a diagram showing concept of positioning between the image for S/N ratio correction and a captured image.
FIG. 18 is a diagram showing an example of a movement correcting process selecting menu screen.
FIG. 19 is a diagram showing an example of an ISO sensitivity selecting menu screen.

The corresponding relation between blocks is determined on the basis of the movement information with respect to a captured image. For example, when the image capturing apparatus 1 is displaced in the β direction between the image 55 for S/N ratio correction and the captured image 56 as shown in FIG. 17, a corresponding block is determined in a state where the captured image 56 is deviated in the β direction from the image 55 for S/N ratio correction. Since blocks corresponding to each other can be determined in a state where a movement after a live view image is obtained is corrected, precision of movement correction increases.

In the case where a block corresponding to a block selected in a captured image exists in the image for S/N ratio correction, the image synthesizing unit 22 executes correlation value computation between the corresponding blocks, thereby obtaining a correlation value between the blocks (step S44). For example, when each block has 8×8 pixels, the differential absolute value of the pixel signals (in this case, color difference information) of corresponding two pixels is obtained with respect to 64 pixels. An average value of 64 differential absolute values obtained can be used as a correlation value. Such a correlation value becomes a small value when corresponding blocks include the same portion of the subject, and becomes a large value when corresponding blocks include different portions.

Therefore, when the correlation value obtained in step S44 is higher than a predetermined value (YES in step S45), color information of the block in the image for S/N ratio correction is employed and stored in the RAM 28 (step S46). That is, color information of a captured image including many noise components is not employed but color information obtained from the live view image is employed as color information of the image for recording.

On the other hand, when the correlation value obtained in step S44 is lower than the predetermined value (NO in step S45), color information of the block in the captured image is employed and stored into the RAM 28 (step S47). That is, since the possibility that the block in the image for S/N ratio correction includes a portion of the subject different from the block image in the captured image is high, to prevent deterioration in picture quality, color information of the captured image is employed as color information of the image for recording. Also in the case where the block corresponding to the block selected in the captured image does not exist in the image for S/N ratio correction, the color information of the block in the captured image is employed.

In step S48, whether the process has been performed on all of blocks of the captured image or not is determined. Until the color information is determined on all of the blocks, the processes (steps S42 to S47) are repeatedly performed.

Such a process is performed on both of the Cr component and the Cb component for the image for S/N ratio correction and the captured image and, finally, the Cr component image and the Cb component image of the image for recording are generated in the RAM 28.

As luminance information (Y component) of the image for recording, the Y component image of the captured image 56 is employed. For example, when all of color information included in the image 55 for S/N ratio correction is employed and constructs the color difference components (Cr component and Cb component) of the image for recording, there is the possibility that the Y component image of the captured image 56 and the color difference component of the image 55 for S/N ratio correction are positionally deviated from each other. Therefore, at the time of synthesizing the Y component image of the captured image 56 and the color information of the image 55 for S/N ratio correction, positioning similar to the case shown in FIG. 17 is performed.

The image for recording (synthetic image) generated by the image synthesizing unit 22 is outputted as an image in which noise components in the color information are suppressed and is recorded on the memory card 8.

As described above, the image capturing apparatus 1 can detect a movement of the image capturing apparatus 1 relative to the subject in the image capturing mode. In the case where the movement correction mode is set in an on state, when a movement is detected during exposure of the image capturing device 10 for obtaining an image for recording, the exposure of the image capturing device 10 is stopped, and an image signal obtained by the exposure is amplified, thereby generating a captured image. By extracting luminance information from the captured image and extracting color information from a live view image obtained at a timing different from a timing at which the captured image is obtained, and synthesizing the luminance information of the captured image and the color information of the live view image, a synthetic image as an image for recording is generated.

Even if color information indicated by the Cr component and the Cb component is replaced with information obtained at an another timing, if the same subject is photographed, a problem does not occur from the viewpoint of picture quality.

Therefore, in the image capturing apparatus 1 of the preferred embodiment, when the movement correction mode is on, an image on which influence of a movement is not exerted can be obtained and noise components amplified by signal amplification can be made inconspicuous.

The color information used for the image for recording is generated on the basis of live view images of at least one frame obtained just before the shutter button 9 is set to the S2 state (that is, immediately before an instruction of exposure start is given), a time difference between a live view image and a captured image as objects of the image synthesizing process can be made shortest, and the correcting process of high consistency can be performed.

When the movement amount of the image capturing apparatus 1 becomes a predetermined amount or larger, the live view images stored in the RAM 28 are erased and, later, a live view image is newly stored. Therefore, an image which does not match the captured image so much can be prevented from being used for the image synthesizing process.

By generating color information which can be applied to an image for recording by using a plurality of live view images, noise components included in the live view images can be suppressed. To be specific, by averaging a plurality of live view images to generate an image for S/N ratio correction, noise components included in an overlapped portion of each live view image can be excellently reduced.

At the time of synthesizing color information of a captured image and color information of an image for S/N ratio correction obtained from a live view image, or at the time of synthesizing luminance information of the captured image and color information generated as an image for recording, the positioning is performed on the basis of movement information at the time of obtaining a captured image. Thus, matching at the time of synthesizing images increases and a high-quality image for recording can be obtained.

Exposure for capturing an image for recording is started after the shutter button 9 is set in the S2 state, an image capturing start instruction is given, and the movement amount of the image capturing apparatus 1 becomes equal to or smaller than the predetermined amount. Therefore, the image capturing apparatus 1 can obtain an image including little movement. Particularly, immediately after the user operates the shutter button 9, a movement often occurs in association with the shutter button operation. By starting exposure after the movement amount becomes equal to or smaller than a predetermined amount as in the preferred embodiment, a movement which occurs immediately after the shutter button operation can be prevented from exerting an influence on a captured image.

At the time of synthesizing the color information obtained from a captured image and color information obtained from a live view image, the image capturing apparatus 1 divides each image into a plurality of areas and performs a synthesizing process on each of the areas. Consequently, the synthesizing process of high matching can be performed on a block unit basis, and a high-quality recording image can be obtained.

In the image capturing apparatus 1, the correlation value between the image for S/N ratio correction obtained from the live view image and the captured image is computed. When the correlation value is higher than a predetermined value, color information of the image for S/N ratio correction obtained from the live view image is employed. When the correlation value is lower than a predetermined value, color information of a captured image is employed and color information of an image for recording is generated. That is, when the degree of matching between the captured image and the image for S/N ratio correction is high, color information of a small amount of noise components is employed. When the degree of matching between the captured image and the image for S/N ratio correction is low, color information of the captured image is employed and color information of a different portion of the subject is not used. Therefore, the process performed in consideration of matching in the synthesizing process and the picture quality is realized, and an excellent image for recording is obtained.

Further, at the time of synthesizing images, the image capturing apparatus 1 employs color information obtained from a captured image as color information of the peripheral portion of the recording image and employs color information obtained from the image for S/N ratio correction as color information in the center portion of the recording image. Therefore, noise components can be excellently suppressed in the center portion of an image and the subject different from that in the captured image can be prevented from being included in the image peripheral portion.

The operations performed in the case where the setting mode functions in the image capturing apparatus 1 will now be described. The image capturing apparatus 1 can made setting of the movement correction mode and setting of a gain usually applied in the AGC circuit 12 in the setting mode.

FIGS. 18 and 19 are diagrams showing an example of a movement correcting process selection menu screen and an example of an ISO sensitivity selection menu screen, respectively, displayed on the LCD 4 or EVF 5 in the setting mode.

For example, in the menu screen of FIG. 18, as selectable items of the movement correcting modes, "only stop exposure", "stop exposure and automatically increase gain", "stop exposure and automatically increase gain+color correction", and "no movement correction" are displayed. The user can select and set one of the items by operating the control button 95. FIG. 18 shows a state where the item of "stop exposure and automatically increase gain+color correction" is selected.

When "only stop exposure" is selected in FIG. 18, if a movement occurs during exposure for a recording image, a process of only stopping exposure of the image capturing device 10 to light is performed and, after that, processes similar to those for a normal captured image are performed. In this case, however, exposure becomes insufficient. A captured image stored in the memory card 8 is therefore a relatively dark image.

When "stop exposure and automatically increase gain" is selected, if a movement occurs during exposure for a recording image, exposure of the image capturing device 10 to light is stopped. Further, after performing the process of increasing the gain applied to the AGC circuit 12, processes similar to those performed for a normal captured image are performed at the post stage of the AGC circuit 12. However, noise components become conspicuous in a captured image due to the increased gain.

When "stop exposure and automatically increase gain+color correction" is selected, the above-described movement correcting process is performed. Specifically, the live view image just before photographing is stored in the RAM 28. When a movement occurs during exposure for a recording image, exposure to the image capturing device 10 is stopped and the color information of a live view image is used as the color information of a recording image. Consequently, by selecting the item, an excellent movement correction is realized.

Further, when "no movement correction" is selected, the gyro sensor 17 is always in an off state in the image capturing mode. Irrespective of the presence or absence of a movement during exposure, exposure operation is performed for exposure time obtained in the automatic exposure (AE) control. Therefore, if a movement occurs during photographing, an influence of the movement conspicuously appears in the captured image.

The gain selection items set in the AGC circuit 12 are displayed generally in correspondence with ISO sensitivity. Consequently, for example, in the menu screen of FIG. 19, "ISO100", "ISO200", "ISO400" and "ISO800" are displayed as selectable items. The user selects and sets one of the items by operating the control button 95. FIG. 19 shows a state where the item of "ISO100" is selected. The relations of gains set in the AGC circuit 12 are ISO100<ISO200<ISO400<ISO800.

When the selection menu screens as described above are independently set without relating the movement correcting process selecting menu screen and the ISO sensitivity selecting menu screen to each other, an inoperable state might occur.

For example, when it is assumed that the gain usually applied in the AGC circuit 12 is set to the maximum executable gain (ISO800), even if the item including the automatic increase of gain is selected in the movement correcting process selecting menu screen, the gain cannot be substantially obtained.

Preferably, the image capturing apparatus 1 is therefore constructed so that subordination is provided between the setting regarding the movement correction and the setting regarding the ISO sensitivity (gain) so that an inoperable state cannot be set. An example of this configuration will be described hereinafter.

Figure 20:
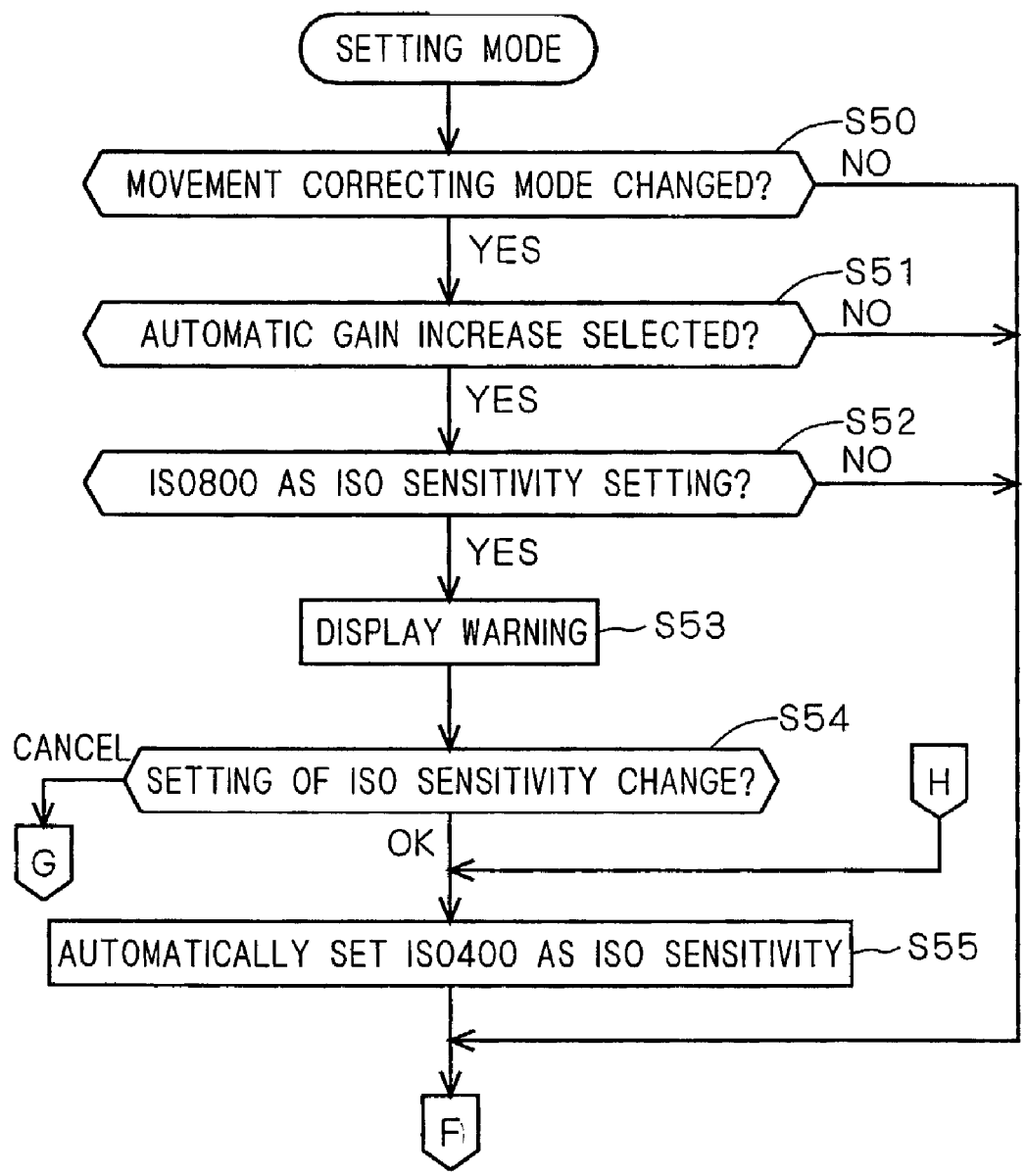
FIG. 20 is a flowchart showing a processing sequence of the image capturing apparatus in a setting mode.
Figure 21:
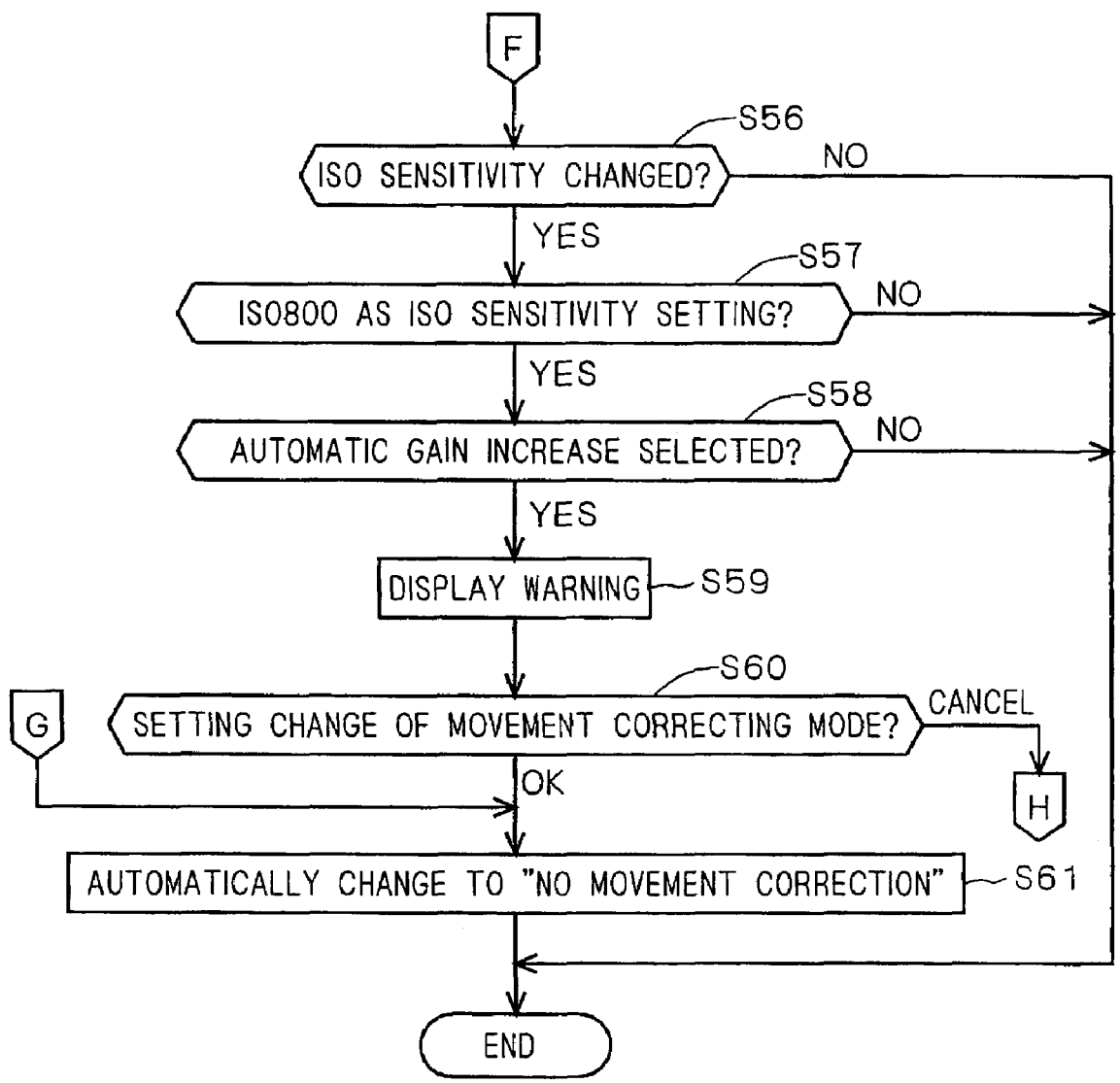
FIG. 21 is a flowchart showing a processing sequence of the image capturing apparatus in the setting mode.

FIGS. 20 and 21 are flowcharts showing processing sequences of the image capturing apparatus 1 in the setting mode.

In the setting mode, the overall control unit 20 determines whether an operation of changing the movement correcting mode has been performed or not (step S50). If NO, the program advances to step S56 (FIG. 21). If YES, the program advances to step S51.

In the case where a movement correcting mode changing operation is performed, whether a process including automatic gain increase is selected or not is determined (step S51). If NO, the program advances to step S56 (FIG. 21). If YES, the program advances to step S52.

In the case where the process including automatic gain increase is selected, whether the present ISO sensitivity setting (gain setting) is the upper limit value of the ISO 800 or not is determined (step S52). If NO, the program advances to step S56 (FIG. 21). If YES,the program advances to step S53.

In the case where the program advances to step S53, since the process including the automatic gain increase is selected as the movement correcting process and the gain usually applied in the AGC circuit 12 is set to the maximum executable gain (ISO800), the movement correcting process desired by the user becomes substantially unexecutable.

In step S53, therefore, to let the user know that the present setting is in an inoperable state, a warning as shown in FIG. 22 is displayed on the LCD 4 or the like and the apparatus waits for an operation of confirmation by the user. In the case of consenting to automatic change of the ISO sensitivity setting on the basis of the warning display of FIG. 22, the user selects "OK" by operating the control button 95. On the other hand, in the case where the user does not consent to the automatic change of the ISO sensitivity setting, the user selects "cancel" by operating the control button 95.

In the case where "OK" is selected by the user, the overall control unit 20 automatically sets the gain of the AGC circuit 12 to ISO400, thereby decreasing the gain which is normally applied. It makes the setting state regarding the movement correcting mode set by the user function effectively. On the other hand, when "cancel" is selected by the user, the program advances to step S61 (FIG. 21) and automatically changes the movement correcting mode to "no movement correction".

In the flowchart of FIG. 21, the overall control unit 20 determines whether the operation of changing the ISO sensitivity (gain) which is normally applied by the AGC circuit 12 has been performed or not (step S56). If NO, the overall control unit 20 finishes the setting mode. If YES, the program advances to step S57.

In the case where the operation of changing the ISO sensitivity is performed, whether the ISO sensitivity is set to the upper limit value, that is, ISO800 or not is determined (step S57). When the ISO sensitivity is not set to the upper limit value, the setting is made valid and the setting mode is finished. If the ISO sensitivity is set to the upper limit value, the program advances to step S58.

When the ISO sensitivity is set to the upper limit value, whether a process including the automatic gain increase is presently selected as a movement correcting mode or not is determined (step S58). If the process including the automatic gain increase is not selected, the setting is made valid and the setting mode is finished. On the other hand, in the case where the process including the automatic gain increase is selected, the program advances to step S59.

Therefore, in the case where the program advances to step S59, the upper limit value (ISO800) is selected as the setting of ISO sensitivity and the process including the automatic gain increase is selected as the movement correcting process. Consequently, the movement correcting process desired by the user is substantially unexecutable.

In step S59, therefore, to let the user know that the present setting is in an inoperable state, a warning as shown in FIG. 23 is displayed on the LCD 4 or the like and the apparatus waits for an operation of confirmation by the user. In the case of consenting to automatic change of the movement correcting mode on the basis of the warning display of FIG. 23, the user selects "OK" by operating the control button 95. On the other hand, in the case where the user does not consent to the automatic change of the movement correcting mode, the user selects "cancel" by operating the control button 95.

In the case where "OK" is selected by the user, the overall control unit 20 automatically changes the setting of the movement correcting mode to "no movement correction" (step S61). On the other hand, when "cancel" is selected by the user, the program returns to step S55 and automatically sets the ISO sensitivity to ISO400, thereby decreasing the gain which is normally applied. It makes the setting regarding the movement correcting mode set by the user function effectively.

As described above, when the gain of the AGC circuit 12 is set to the maximum gain, the image capturing apparatus 1 of this preferred embodiment prohibits the process including the automatic gain increase from being selected to be valid in the setting mode. In the case where the process including the automatic gain increase is selected in a valid state, when the gain of the AGC circuit 12 is set to the maximum gain, the state in which the process including the automatic gain increase is valid is canceled.

When the process including the automatic gain increase is selected in a valid state, the image capturing apparatus 1 prohibits the gain of the AGC circuit 12 from being set to the maximum gain. Further, in the case where the gain of the AGC circuit 12 is set as the maximum gain, when the process including automatic gain increase is set to be valid, the set value of the gain in the AGC circuit 12 is changed to a value smaller than the maximum gain.

Consequently, the setting regarding the movement correction and the setting regarding the gain have subordinate in the image capturing apparatus 1 and an unexecutable process is prevented from being set. Therefore, the user can grasp an error in the setting selected in the setting mode in advance, thereby enabling photographing from being failed.

In the case where ISO sensitivity is set to ISO800 (upper limit value) in the image capturing apparatus 1, as shown in FIG. 24, it is possible to notify the user of the situation that the process including automatic gain increase cannot be selected by displaying the items including automatic gain increase in a different color or in halftone on the movement correcting process selecting menu screen.

Figure 25:
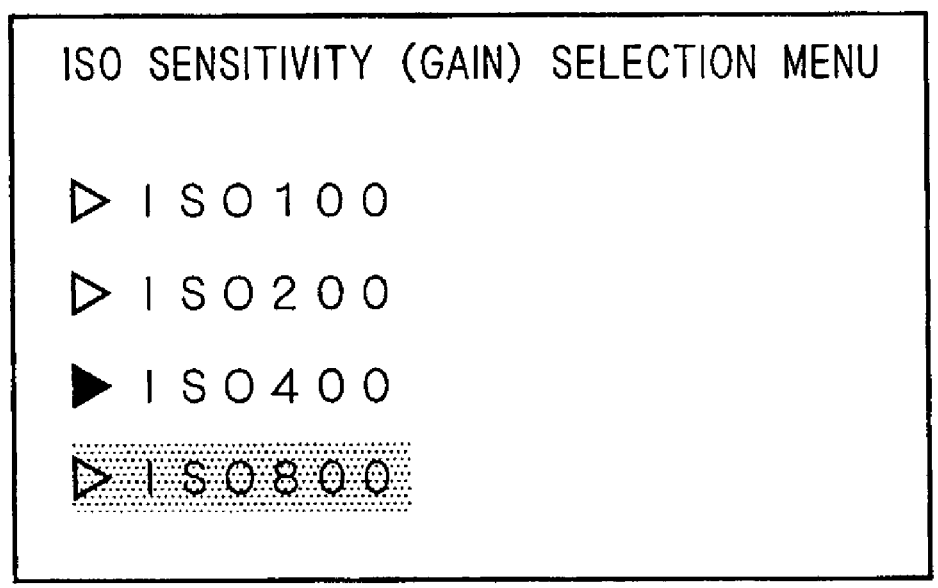
FIG. 25 is a diagram showing an example of the ISO sensitivity selecting menu screen.

Similarly, when the process including automatic gain increase is selected to be valid as the movement correcting process, as shown in FIG. 25, it is possible to notify the user of the situation that ISO800 cannot be selected by displaying the item of ISO800 as the maximum value of the ISO sensitivity in a different color or in halftone on the ISO sensitivity (gain) selecting menu screen.

Although the case of generating an image for S/N ratio correction from live view images of four frames has been described above, the image for S/N ratio correction may be generated from one live view image. For example, when all of live view images stored in the RAM 28 are deleted immediately before a photographing instruction is given so that only a live view image of one frame is stored in the RAM 28 when the image capturing instruction is given, the image for S/N ratio correction is generated from the live view image.

2. Second Preferred Embodiment

A preferred embodiment of an image processing apparatus will now be described. The above-described movement correcting process executed by the overall control unit 20 in the image capturing apparatus 1, more concretely, the process shown in the flowchart of FIG. 12 can be also executed by an image processing apparatus which is independent of the image capturing apparatus 1. In the second preferred embodiment, the image processing apparatus executing such process will be described.

FIG. 26 is a diagram showing the configuration of an image processing system 100 including an image processing apparatus 7. The image processing apparatus 7 is connected to an image capturing apparatus 1a and can receive image data from the image capturing apparatus 1a.

The image capturing apparatus 1a includes a taking lens 110, an image capturing device 111, an AGC circuit 112, an output unit 113, a gyro sensor 114, and an image capturing control unit 115. In the case of photographing the subject in response to the image capturing instruction signal generated in association with depression of a not-shown shutter button, the image capturing control unit 115 detects the movement amount of the image capturing apparatus 1a on the basis of an output from the gyro sensor 114. When the movement amount becomes a predetermined value or larger, exposure of the image capturing device 111 to light is stopped, and an image signal obtained with the exposure is made output to the AGC circuit 112. When the exposure of the image capturing device 111 is stopped in the middle, the image capturing control unit 115 increases the gain of the AGC circuit 112, thereby compensating insufficient exposure. A captured image is transmitted to the image processing apparatus 7 via the output unit 113.

The image capturing apparatus 1a performs an image capturing operation at a timing different from the timing of the image capturing operation performed in response to the image capturing instruction signal and sequentially transmits images obtained at the different timings (which are different from the captured images) to the image processing apparatus 7.

More preferably, the image capturing apparatus 1a transmits the movement information obtained from the gyro sensor 114 so as to be associated with an image to the image processing apparatus 7.

The image processing apparatus 7 includes a display unit 120, a process unit 130, and an operation unit 140. The process unit 130 has an input unit 133 for receiving data from the image capturing apparatus 1a, a CPU 131 for executing programs realizing various functions, a storing unit 135 for storing image data inputted from the image capturing apparatus 1a, and an input/output unit 134 capable of reading a program from a recording medium 150 such as a CD-ROM.

The CPU 131 reads and executes, for example, an image processing program stored in the recording medium 150, thereby functioning as an image processing unit 132.

The image processing unit 132 temporarily stores the captured image received from the image capturing apparatus 1a and an image captured at the timing different from the captured image, and received from the image capturing apparatus 1a, into the storing unit 135 and performs the movement correcting process described in the first preferred embodiment, thereby generating a recording image in which noise components are inconspicuous on which no influence of the movement is exerted.

Specifically, the image processing apparatus 7 receives a captured image obtained with exposure of time shorter than a proper value and an image for correction (corresponding to the live view image) obtained at a timing different from the timing at which the captured image was obtained, extracts luminance information and color information from the captured image, and extracts color information from the image for correction. By synthesizing the color information obtained from the captured image and the color information obtained from the image for correction, a synthetic image as a recording image is generated and the luminance component in the synthetic image is specified by luminance information of the captured image.

Therefore, the image processing apparatus 7 of the preferred embodiment can generate an image on which an influence of a movement is not exerted while suppressing increase of noise components.

In a manner similar to the first preferred embodiment, the image processing apparatus 7 employs color information obtained from the captured image as color information of the peripheral portion of the recording image, and employs the color information of the image for correction obtained at a timing different from the timing of the captured image as color information in the center portion of the recording image. Therefore, noise components in the image center portion can be suppressed and the image peripheral portion can be prevented from including the subject different from that of the captured image.

In a manner similar to the first preferred embodiment, at the time of synthesizing color information obtained from the captured image and color information of the image for correction obtained at a timing different from the timing at which the captured image is obtained, the image processing apparatus 7 divides each of the images into a plurality of areas and performs the synthesizing process on the area unit basis. Consequently, the synthesizing process of a high degree of matching can be performed on each block and a high-quality recording image can be obtained.

The image processing apparatus 7 obtains a correlation value between the captured image and the image for correction obtained at a timing different from the timing at which the captured image is obtained. The image processing apparatus 7 employs color information of the image for correction when the correlation value is higher than a predetermined value and employs color information of the captured image when the correlation value is lower than the predetermined, thereby generating color information of the recording image. That is, when the degree of matching between the captured image and the image for correction is high, color information of small noise components is employed. When the degree of matching between the captured image and the image for correction is low, the color information of the captured image is employed and color information of a different subject portion is not used. Therefore, the process performed in consideration of the degree of matching in the synthesizing process and the picture quality is realized and an excellent recording image is obtained.

In the second preferred embodiment as well, in a manner similar to the first preferred embodiment, an image of a plurality of frames obtained at a timing different from the timing at which the captured image is obtained is received and an image for correction may be generated from an overlapped portion of the plurality of frames.

As described above, the image processing apparatus 7 of the preferred embodiment is constructed so that the image processing function described in the first preferred embodiment is separated from the image capturing apparatus. Therefore, the image processing apparatus 7 produces action and effects similar to those described in the first preferred embodiment.

In the preferred embodiment, the case where the image capturing apparatus 1a is connected to the image processing apparatus 7 and the image processing apparatus 7 receives images from the image capturing apparatus 1a via a connection cable or the like has been described but the present invention is not limited to the case. For example, the image processing apparatus 7 may be constructed to receive images by radio communication from the image capturing apparatus 1a or receives images via the memory card 8.

3. Modifications

Although the preferred embodiments of the present invention have been described above, the present invention is not limited to the above description.

For example, in the foregoing preferred embodiment, when exposure is interrupted, the gain is increased in a state where the image signal is an analog signal. However, the present invention is not limited to the configuration but the gain may be increased on a digital signal at the post stage of the A/D converter 13.

In the foregoing preferred embodiments, the configuration in which the gyro sensors 17 and 114 are provided to detect a movement of the image capturing apparatus has been described. The present invention, however, is not limited to the configuration. As a sensor for detecting a movement of the image capturing apparatus, an optical sensor may be used.

While the invention has been shown and described in detail, the foregoing description is in all aspects illustrative and not restrictive. It is therefore understood that numerous modifications and variations can be devised without departing from the scope of the invention.

What is claimed is:

1. An image capturing apparatus comprising:
   an image sensor for converting a subject image into an image signal;
   a movement detector for detecting a movement of said image capturing apparatus relative to the subject;
   an exposure controller for interrupting exposure of said image sensor when a movement is detected by said movement detector during exposure of said image sensor to light;
   a first image generator for generating first image data by amplifying an image signal read out from said image sensor of which exposure is interrupted by said exposure controller;
   a second image generator for extracting luminance information from said first image data, extracting color information from second image data obtained from said image sensor at a timing different from the timing at which said first image is obtained, and generating image data obtained by synthesizing said luminance information and said color information, said second image data is deleted from said memory when the amount of the movement detected by said movement detector becomes equal to or larger than a predetermined amount; and
   an instructing member for instructing start of exposure by said image sensor; and a memory for storing said second image data before an instruction from said instructing member, wherein said second image generator extracts said color information from said second image data stored in said memory.

2. An image capturing apparatus comprising:
   an image sensor for converting a subject image to an image signal;
   a movement detector for detecting a movement of said image capturing apparatus relative to the subject;
   a corrector for correcting said movement on the basis of an output of said movement detector;
   a first selector for selecting whether a movement correction by said corrector is performed or not;
   a second selector for selecting gain of said image signal; and
   a controller for controlling another selection on the basis of one of the selections of said first and second selectors;
   wherein when the maximum gain is selected by said second selector, said controller disables selection of execution of the movement correction by said first selector.

3. An image capturing apparatus comprising:
   an image sensor for converting a subject image to an image signal;
   a movement detector for detecting a movement of said image capturing apparatus relative to the subject;
   a corrector for correcting said movement on the basis of an output of said movement detector;
   a first selector for selecting whether a movement correction by said corrector is performed or not;
   a second selector for selecting gain of said image signal; and
   a controller for controlling another selection on the basis of one of the selections of said first and second selectors;
   wherein when the maximum gain is selected by said second selector and execution of the movement correction is selected by said first selector, said controller cancels selection of execution of the movement correction.

4. An image capturing apparatus comprising:
   an image sensor for converting a subject image to an image signal;
   a movement detector for detecting a movement of said image capturing apparatus relative to the subject;
   a corrector for correcting said movement on the basis of an output of said movement detector;
   a first selector for selecting whether a movement correction by said corrector is performed or not;
   a second selector for selecting gain of said image signal; and
   a controller for controlling another selection on the basis of one of the selections of said first and second selectors;
   wherein when execution of the movement correction is selected by said first selector, said controller disables selection of the maximum gain by said second selector.

5. An image capturing apparatus comprising:
   an image sensor for converting a subject image to an image signal;
   a movement detector for detecting a movement of said image capturing apparatus relative to the subject;
   a corrector for correcting said movement on the basis of an output of said movement detector;
   a first selector for selecting whether a movement correction by said corrector is performed or not;
   a second selector for selecting gain of said image signal; and
   a controller for controlling another selection on the basis of one of the selections of said first and second selectors;
   wherein when execution of the movement correction is selected by said first selector and the maximum gain is selected by said second selector, said controller cancels selection of the maximum gain.

6. An image processing apparatus comprising:
   an input part for receiving first image data obtained in exposure time shorter than a proper value and second image data obtained at a timing different from a timing at which said first image data is obtained;
   an extractor for extracting luminance information and color information from said first image data and extracting color information from said second image data;
   an image generator for generating a synthetic image obtained by synthesizing the luminance information and color information from said first image data and the color information of said second image data; and a detector for detecting the degree of correlation between said first and second image data;

wherein said image generator generates said synthetic image on the basis of the degree of correlation detected by said detector.

7. The image processing apparatus according to claim 6, wherein when the degree of correlation detected by said detector is higher than predetermined level, said image generator employs color information obtained from said second image data as color information of said synthetic image.

8. The image processing apparatus according to claim 6, wherein when the degree of correlation detected by said detector is lower than predetermined level, said image generator employs color information obtained from said first image data as color information of said synthetic image.

9. An image processing apparatus comprising:

an input part for receiving first image data obtained in exposure time shorter than a proper value and second image data obtained at a timing different from a timing at which said first image data is obtained;

an extractor for extracting luminance information and color information from said first image data and extracting color information from said second image data; and an image generator for generating a synthetic image obtained by synthesizing the luminance information and color information from said first image data and the color information of said second image data, said image generator employs color information obtained from said first image data as color information of a peripheral portion of said synthetic image and employs color information obtained from said second image data as color information of a center portion of said synthetic image.

* * * * *